(12) United States Patent
Yamaguchi et al.

(10) Patent No.: US 7,654,364 B2
(45) Date of Patent: Feb. 2, 2010

(54) SOUND ABSORBING STRUCTURE

(75) Inventors: Zenzo Yamaguchi, Kobe (JP); Ichiro Yamagiwa, Kobe (JP); Toshimitsu Tanaka, Kobe (JP); Hiroki Ueda, Kobe (JP); Kensuke Tsubota, Tokyo (JP)

(73) Assignee: Kabushiki Kaisha Kobe Seiko Sho, Hyogo (JP)

(*) Notice: Subject to any disclaimer, the term of this patent is extended or adjusted under 35 U.S.C. 154(b) by 158 days.

(21) Appl. No.: 11/792,297

(22) PCT Filed: Dec. 15, 2005

(86) PCT No.: PCT/JP2005/023056

§ 371 (c)(1),
(2), (4) Date: Jun. 5, 2007

(87) PCT Pub. No.: WO2006/068028

PCT Pub. Date: Jun. 29, 2006

(65) Prior Publication Data

US 2008/0128201 A1 Jun. 5, 2008

(30) Foreign Application Priority Data

Dec. 24, 2004 (JP) ............................. 2004-374160
Nov. 29, 2005 (JP) ............................. 2005-343516

(51) Int. Cl.
*E04B 1/82* (2006.01)

(52) U.S. Cl. .................................................. 181/293

(58) Field of Classification Search ................. 181/293, 181/294, 296, 284, 286
See application file for complete search history.

(56) References Cited

U.S. PATENT DOCUMENTS 4,300,978 A * 11/1981 Whitemore et al. ......... 156/581

(Continued)

FOREIGN PATENT DOCUMENTS

EP    DE 4412427    4/1994

(Continued)

OTHER PUBLICATIONS

Machine translation of JP 2002274287 and figures, PAJ website.*

(Continued)

*Primary Examiner*—Jeffrey Donels
*Assistant Examiner*—Forrest M Phillips
(74) *Attorney, Agent, or Firm*—Stites & Harbison PLLC; Juan Carlos A. Marquez, Esq.

(57) ABSTRACT

A sound absorbing structure having excellent in sound absorbing performance, which is capable of achieving 0.4 or higher in the sound absorbing coefficient even in the case where a perforated panel is a thin plate such as aluminum foil within a range where a reduction in the weight of a vehicle body is not impaired and through holes have a large hole diameter in order to make the processing of providing a large number of through holes in the perforated panel. The sound absorbing structure 1 is the sound absorbing structure 1 for suppressing noise generated on a sound source side, which is equipped with: a perforated panel 2 having a large number of through holes 3 and a fiber material 4, which are provided so as to face the sound source side and provided so as to overlap with each other; and an air layer 5 provided behind the perforated panel 2, in which the density and the thickness of the fiber material 4 and the hole diameter and the aperture rate of the through holes 3 of the perforated panel 2 severally have a specific relationship.

8 Claims, 31 Drawing Sheets

U.S. PATENT DOCUMENTS

| | | | | | |
|---|---|---|---|---|---|
| 4,553,631 | A | * | 11/1985 | Panza | 181/291 |
| 4,607,466 | A | * | 8/1986 | Allred | 52/144 |
| 2007/0062758 | A1 | * | 3/2007 | Jensen et al. | 181/290 |

FOREIGN PATENT DOCUMENTS

| | | |
|---|---|---|
| JP | 06-298014 | 4/1993 |
| JP | 9-134180 | 11/1995 |
| JP | 09-134180 | 11/1995 |
| JP | 10-264281 | 3/1997 |
| JP | 11-3082 | 6/1997 |
| JP | 11-003082 | 6/1997 |
| JP | 2002-274287 | 3/2001 |
| JP | 2003-050586 | 6/2001 |
| JP | 2003-22077 | 7/2001 |
| WO | WO 98/18656 | 5/1998 |
| WO | WO 2006/068028 | 6/2006 |

OTHER PUBLICATIONS

International Search Report of PCT/JP2005/23056 mailed Mar. 14, 2006.
International Search Report dated Mar. 14, 2006.
Office Action from the German Patent Office dated Feb. 26, 2009.

* cited by examiner

SOUND WAVE

SOUND INSULATION SIDE

SOUND SOURCE SIDE

SOUND WAVE

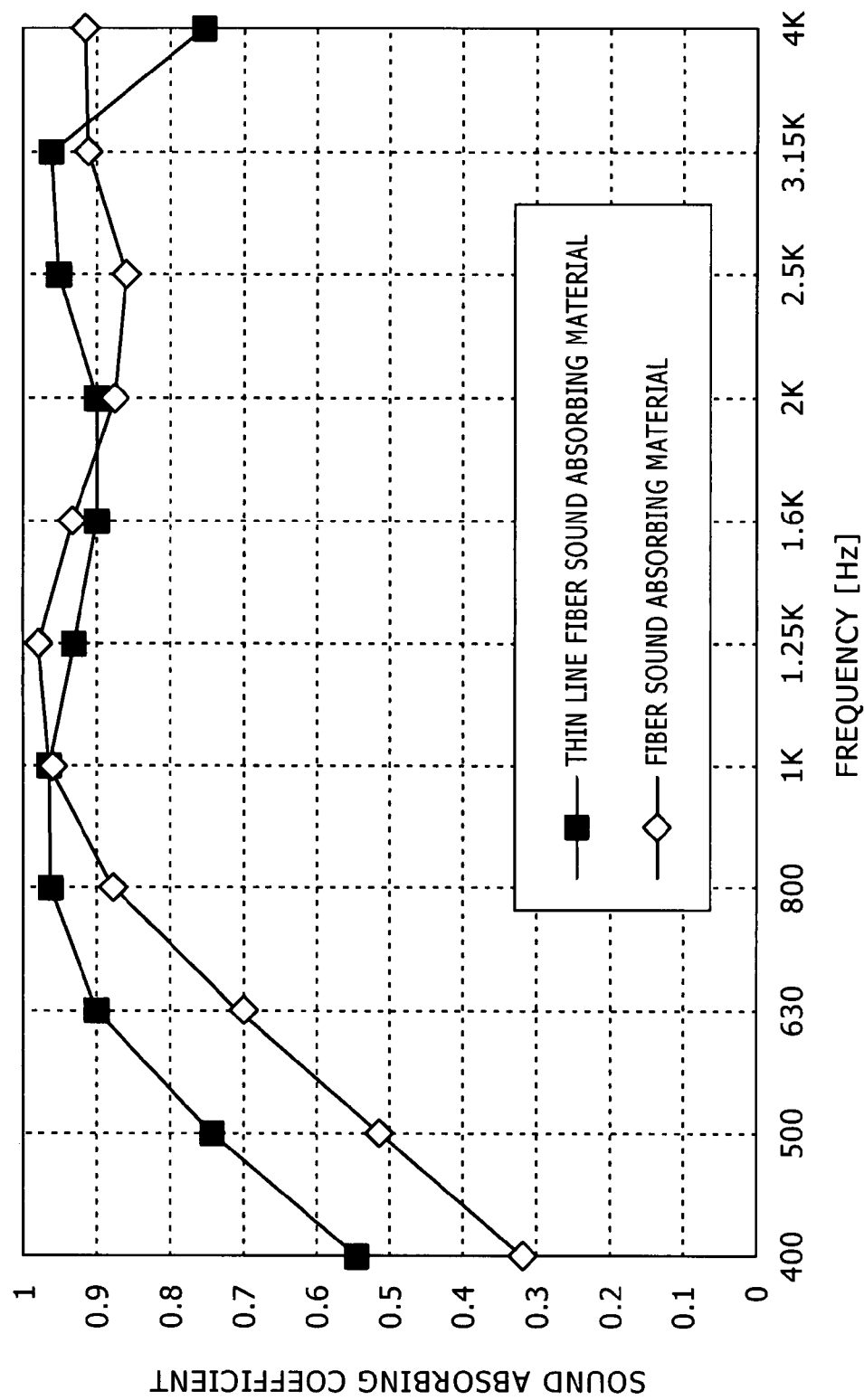

SOUND ABSORBING STRUCTURE

FIELD OF THE INVENTION

The present invention relates to a sound absorbing structure having excellent in sound absorbing performance, which is capable of achieving 0.4 or higher in sound absorbing coefficient, and to a sound absorbing structure applicable for vehicle application such as an automotive vehicle, structure application such as a sound barrier and a tunnel inner wall, or the application of various fields in which another sound absorption is necessary.

TECHNICAL FIELD

The explanation below will be made by taking the vehicle application being a main application as an example out of various fields in which sound absorption by a sound absorbing structure according to the present invention is necessary.

In recent years, automotive vehicles are required to suppress noise generated on a sound source side of vehicle for more comfortable vehicle drive. For example, in an engine hood of an automotive vehicle, sound absorbing effect to absorb and reduce engine sound inside a vehicle body is required.

For this reason, a sound absorbing material, that constitutes a sound absorbing structure for suppressing noise generated on the sound source side of the vehicle, has been attached to the vehicle.

As the sound absorbing material constituting such a sound absorbing structure, there is a porous sound insulating structure body that insulates sound by using Helmholtz resonance principle in a constitution where a interior plate having a large number of through holes are formed on the entire plate surface is oppositely arranged to an exterior plate via an air layer.

For example, paying attention to the fact that the general formula of Helmholtz resonance principle is "$f=(c/2\pi) \times \sqrt{\{\beta/(t+1.6b)d\}}$", there is a porous sound insulating structure body that is constituted so as to reduce noise in a particular resonance frequency f efficiently based on the general formula. Meanwhile, the above-described general formula shows resonance frequency f by using sound velocity c, aperture ratio $\beta$, plate thickness t of interior plate, hole diameter b, and rear air layer thickness d as parameters.

Further, there is a sound absorbing material that is mounted and attached to a hood panel, a roof panel, a floor panel, an engine cover or the like, and is used for suppressing noise to propagate to the outside, the inside of vehicle or the like.

The sound absorbing material includes a high frequency area absorption layer made up of a nonwoven fiber layer and a low frequency area absorption layer that is provided so as to be stacked on it and made up of a perforated plate and an air layer behind it, specifically. Then, an air layer is provided between the both absorption layers, the high frequency area absorption layer is arranged on a side closer to a noise source, and the low frequency area absorption layer is arranged on a side remote from noise source.

As an operation of the sound absorbing material, when noise is allowed to enter the high frequency area absorption layer, viscosity resistance and thermal transmission of air in nonwoven fiber in the layer attenuate the energy that the noise has. Further, due to fine vibration of the nonwoven fiber itself and friction occurred among nonwoven fibers that contact each other, the energy that the noise has is converted into vibration heat and friction heat, the energy that the noise has is attenuated.

Further, noise in the low frequency area can be absorbed mainly by the low frequency area absorption layer. Specifically, regarding noise in a relatively low frequency area, which has passed through the high frequency area absorption layer, the energy that the noise has is attenuated by the resonance operation of the low frequency area absorption layer.

Further, there is a sound insulating structure provided for a power generator having an engine as a noise source, an engine hood portion or an engine under cover portion of auto four-wheel vehicle, which has an engine as a noise source, a ceiling portion of auto four-wheel vehicle, which has audio equipment as a noise source, a tank rear cover portion of auto two-wheel vehicle, which has an engine as a noise source, or the like.

In the sound insulating structure, a sound insulating member is disposed inside at least a part of the outer plate of a muffler with the air layer between, specifically. Then, the sound insulating member is constituted by a sound absorbing material that is mainly made of fiber or foamed material and a metal foil such as aluminum that is provided on the outer surface, the inside, or the inner surface of the sound absorbing material in a stacked manner and on which a large number of through holes or a large number of cut lines are formed dispersedly.

In the sound insulating structure, noise generated from a noise source easily causes the periphery of the large number of cut lines or through holes of aluminum foil or the like to finely vibrate. The vibration converts the acoustic energy of noise into the vibration energy of aluminum foil on the outer surface to attenuate. Furthermore, since the sound insulating member is disposed inside the above-described outer plate with the air layer between, the sound can be absorbed and attenuated by reflecting diffused sound leaked from the cut lines or the through holes is reflected on the outer plate and taking it into the sound absorbing material again. Thus, it is more effective in noise reduction.

Further, in the porous sound insulating structure body where the exterior plate and the interior plate having a large number of through holes are oppositely arranged, there is a porous sound insulating structure body characterized in that the plate thickness, the bore diameter and the aperture ratio of the interior plate are set so as to satisfy a design condition in which viscous operation is generated in air flowing through the through holes.

DISCLOSURE OF THE INVENTION

The through holes provided in the above-described perforated plate are large holes having the hole diameter of about 0.5 mm. Further, through holes provided in the above-described aluminum foil are also large holes having the hole diameter of about $\phi 1$ mm.

For this reason, in these holes, there is a possibility that sound absorbing coefficient to noise in frequency other than resonance frequency f becomes extremely low. Therefore, there are cases where sound absorbing performance cannot be fully exercised to noise including a plurality of frequencies as a peak component on sound absorbing performance, and sound absorbing coefficient becomes less than 0.4.

In the sound absorbing coefficient in a single fiber material made of nonwoven fabric cloth or fiber such as regular felt, glass wool, rock wool or the like, the sound absorbing coefficient is about 0.4 or lower depending on density and thickness. Therefore, to improve the sound absorbing coefficient, thickness needs to be made thicker, and when an arrangement space or weight of the sound absorbing structure is limited, there are cases where the sound absorbing coefficient of 0.4 or higher cannot be achieved.

To increase the sound absorbing coefficient to 0.4 or higher, it is preferable that the bore diameter (hole diameter) of the interior plate (perforated panel) having through holes be as small as possible.

However, in fabricating the perforated panel, it is very difficult to provide through holes having such a small hole diameter in a relatively thin metal plate. Particularly, the aluminum foil has the thickness of only about 20 μm out of perforated panels and is soft. Therefore, processing of providing a large number of fine through holes in such an aluminum foil has been associated with extreme difficulty and high cost.

Therefore, it is an object of the present invention to provide a sound absorbing structure capable of further improving sound absorbing coefficient without making the hole diameter of the perforated panel smaller.

The gist of the sound absorbing structure according to the present invention in order to achieve the above-described object is a sound absorbing structure for suppressing noise generated on a sound source side, which is equipped with: perforated panel having a large number of through holes and a fiber material, which are oppositely provided on the sound source side and provided so as to stacked on each other; and an air layer provided behind the perforated panel or the fiber material, in which the fiber material satisfies Equation (1) below and the perforated panel satisfies Equation (2) below.

$$\rho \times t \geq 0.01 \text{ kg/m}^2 \quad (1)$$

$$\beta \geq 10^x \quad (2)$$

where
$x = 4/3 \times \log_{10} d - 1/3$
$\rho$: density of fiber material (kg/m³)
t: thickness of fiber material (mm)
d: hole diameter of through holes of perforated panel (mm)
$\beta$: aperture ratio of through holes of perforated panel (%)

In the sound absorbing structure of the present invention, on the assumption that a product of the density $\rho$ and the thickness t of fiber material be the above-described certain value or more, the aperture ratio $\beta$ of the through holes of the perforated panel is also regulated on a relationship with the hole diameter d of the through holes.

As described, by allowing the fiber material and the perforated panel to have the relative relationship, in other words, by allowing the fiber material and the perforated panel to satisfy Equation (1) above and Equation (2) above respectively, even in the case there the perforated panel is a thin plate such as the aluminum foil and the through holes have a large hole diameter to facilitate the processing of providing a large number of through holes in the perforated panel, the sound absorbing structure excellent in sound absorbing performance, which is capable of achieving the sound absorbing coefficient of 0.4 or higher, can be provided.

BRIEF DESCRIPTION OF THE DRAWINGS

FIG. 1 is partially enlarged.

FIG. 1 is partially enlarged.

FIG. 36 is an explanatory view showing the sound absorbing effect of the sound absorbing structure according to the present invention.

BEST MODE FOR CARRYING OUT THE INVENTION

Figure 1:
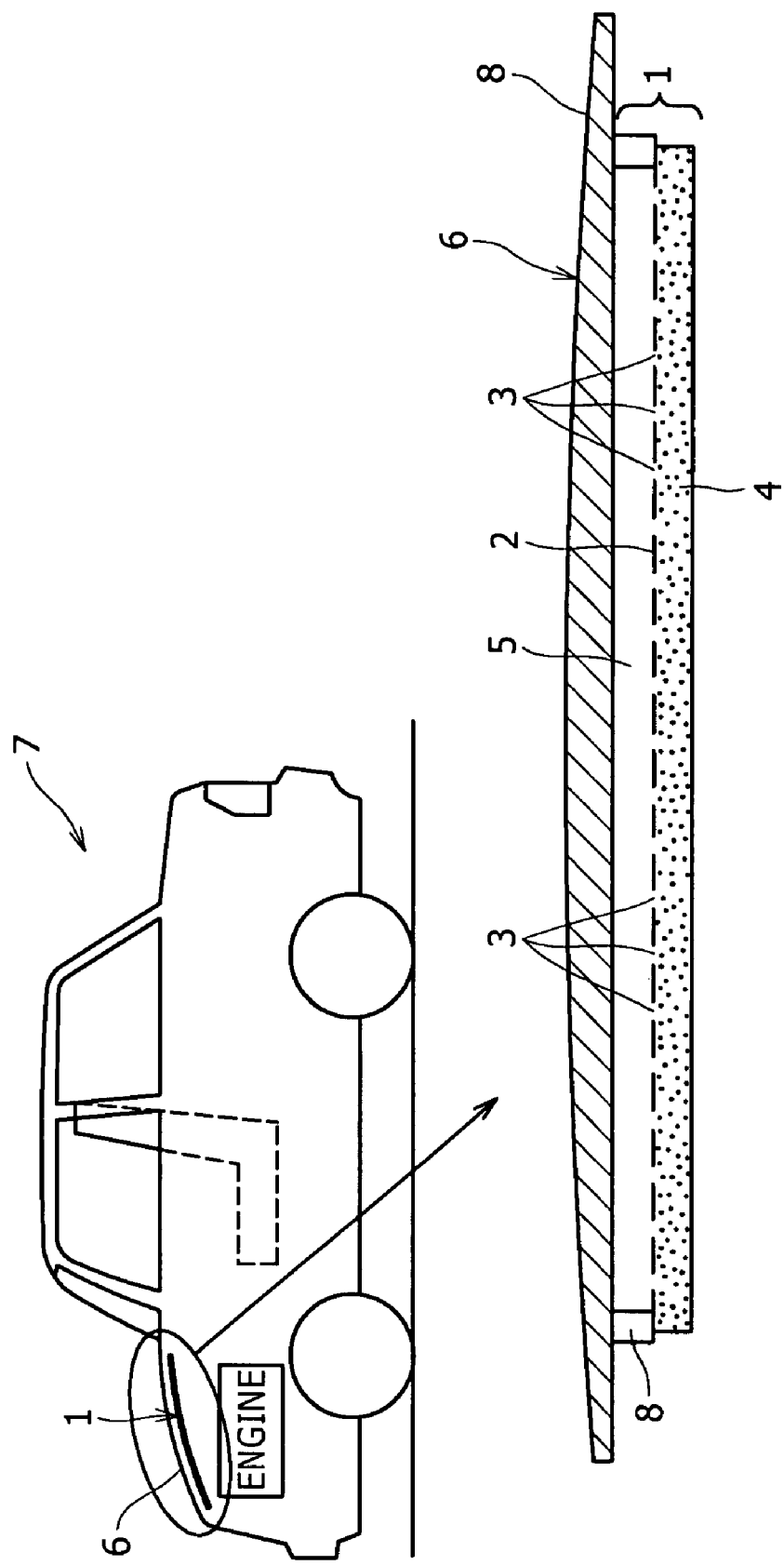
FIG. 1 is a sectional view showing one embodiment of the sound absorbing structure according to the present invention.
Figure 2:
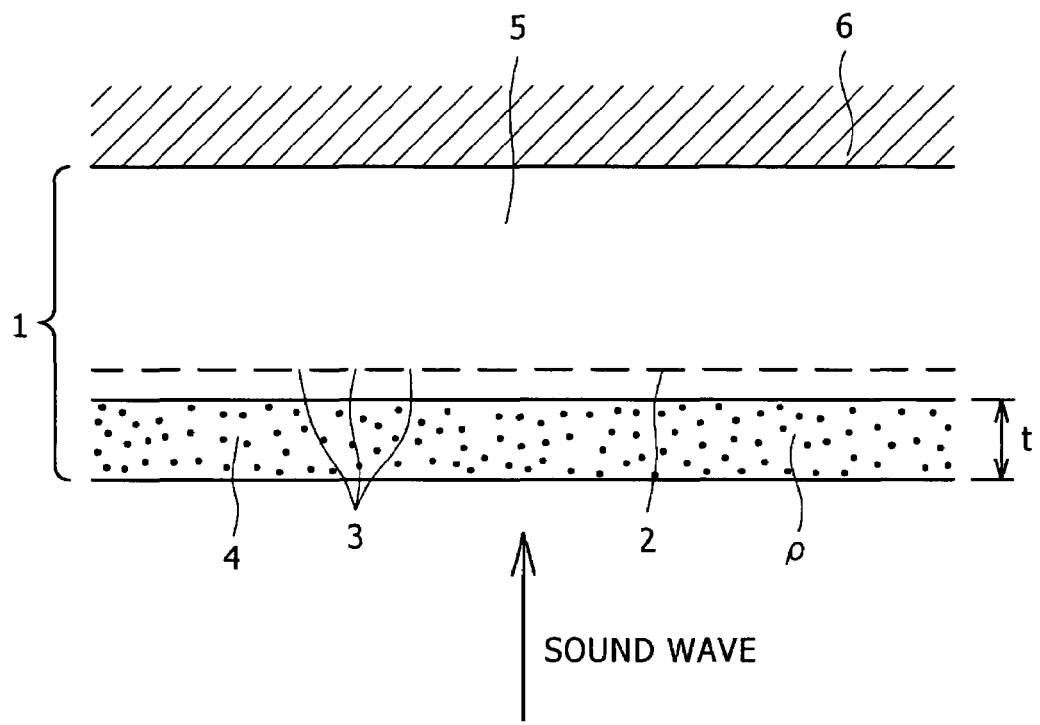
FIG. 2 is a sectional view where
Figure 3:
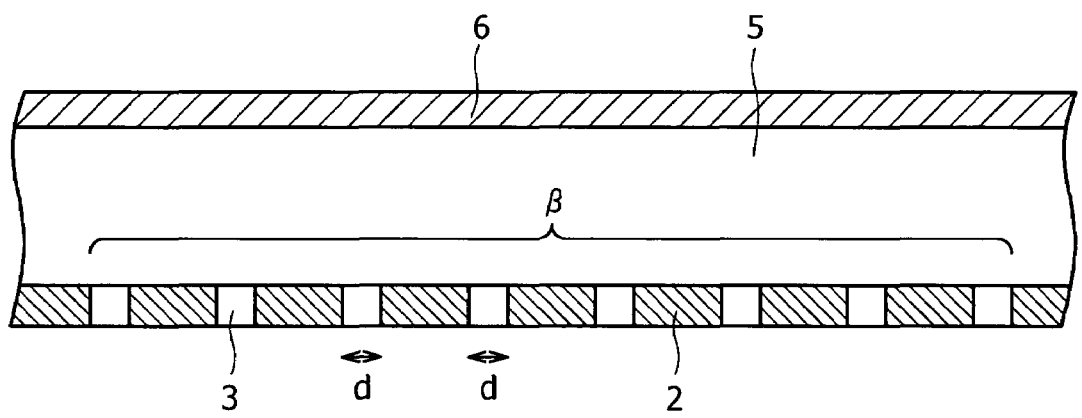
FIG. 3 is a sectional view where

By using FIG. 1 to FIG. 3, description will be specifically made for the case of an embodiment where the present invention is applied for a sound absorbing structure for vehicle use. FIG. 1 is the sectional view showing a mode where a sound absorbing structure for vehicle use of the present invention is arranged on the hood rear surface of an automotive vehicle, FIG. 2 is the partial sectional view of FIG. 1, and FIG. 3 is also the partial sectional view of FIG. 1.

The sound absorbing structure 1 of the present invention in FIG. 1 is arranged on the engine sound source side of the rear surface of a hood 6 of the automotive vehicle, and suppresses noise generated on engine sound source side.

The mode of a sound absorbing structure 1 in FIG. 1 is basically equipped with a fiber material 4, a perforated panel 2 having a large number of through holes 3 and being provided so as to be stacked on the fiber material 4, and a air layer 5 behind the perforated panel 2 in order from the engine sound source side. However, similar effect can be obtained when the perforated panel 2 is arranged on the front face of the sound source side instead of the fiber material 4 and the fiber material 4 is arranged behind it so as to be stacked on the perforated panel 2.

(Fiber Material)

In this example, the fiber material 4 is a fiber material including a foamed material of interconnected bubble or the like. The fiber material 4 is arranged on front face to the noise (sound wave) from the engine sound source side in order to exert sound absorbing effect. Note that, as described above, the sound absorbing effect of the fiber material 4 can be similarly obtained when the perforated panel 2 is arranged on front face of the sound source side and the fiber material 4 is arranged behind it so as to be stacked on the perforated panel 2.

In order to exert the sound absorbing effect, it is preferable that the density ρ of the fiber material be within the range from 10 to 400 kg/m$^3$. In the case where the density ρ of the fiber material is less than 10 kg/m$^3$ or exceeds 400 kg/m$^3$, there is a possibility that the sound absorbing effect of the fiber material 4 will be reduced in both cases.

As a fiber material having such density ρ, a porous fiber material is applicable. As the porous fiber material, a cotton like material as defined in The Dictionary of Acoustic Terms (edited by Acoustical Society of Japan), a widely-known sound absorbing material, and a foamed material of interconnected bubble or the like, in which nonwoven fabric cloth or fiber such as felt, glass wool, rock wool or the like is tangled into porous, can be used, and it is appropriately selected from them.

Furthermore, in the fiber material 4, it is necessary that the density ρ of the fiber material (kg/m$^3$) shown in FIG. 2 and the thickness t of the fiber material (mm) satisfy Equation (1) below.

$$\rho \times t \geq 0.01 \text{ kg/m}^2 \tag{1}$$

In the case where the density ρ of the fiber material and the thickness t of the fiber material satisfy Equation (1), high sound absorbing coefficient of 0.4 or higher can be obtained regardless of the plate thickness of the perforated panel 2 in the constitution where the perforated panel 2 and the air layer 5 are combined. On the other hand, in the case where the density ρ of the fiber material and the thickness t of the fiber material do not satisfy Equation (1), the sound absorbing coefficient is reduced to as low as the sound absorbing coefficient in the case where only the perforated panel 2 exists even if the aperture ratio β of the through holes 3 of the perforated panel 2 satisfies Equation (2). Specifically, in the case where Equation (1) is not satisfied because either the density ρ or the thickness t or both of them are too small, particularly, the sound absorbing coefficient at the time when the through holes 3 are set to a large hole diameter d exceeding 0.8 mm, which is easy to process, cannot be made 0.4 or higher.

(Perforated Panel)

FIG. 1 shows a mode using a metal foil such as aluminum (hereinafter, simply referred to as an aluminum foil) contributing to reduction of weight as the perforated panel 2. Since the sound absorbing structure 1 of the present invention is a member that is arranged newly added to the engine sound source side on the rear surface of the hood 6 of the automotive vehicle, it is preferable that it be as light as possible. At this point, in the case of using a thin aluminum foil, the member itself can be made even lighter than the case of using an aluminum alloy plate or the like. Therefore, the perforated panel of the present invention includes not only a regular plate but also ones such as foil and film having extremely thin thickness.

The perforated panel 2 absorbs sound by Helmholtz resonance principle similar to the above-described Prior Art, but, in the present invention, it is assumed that the hole diameter d (mm) of each through hole 3 (refer to FIG. 3) in the perforated panel 2 and the aperture ratio β(%) of through holes, which is a ratio of a total area of all through holes to the surface area of the perforated panel 2 satisfy Equation (2) below.

$$\beta \geq 10^x \text{ where } x = 4/3 \times \log_{10} d - 1/3 \tag{2}$$

In the case where the aperture ratio β of the through holes 3 satisfies Equation (2), the high sound absorbing coefficient of 0.4 or higher is obtained regardless of the plate thickness of the perforated panel 2 or the like in the constitution where the fiber material 4 and the air layer 5 are combined. On the other hand, in the case where the aperture ratio β of the through holes 3 does not satisfy Equation (2), the sound absorbing coefficient is reduced even if the density ρ of the fiber material and the thickness t of the fiber material satisfy Equation (1). Specifically, in the case where the aperture ratio β is too small because the number of through holes 3 is too small, particularly, the sound absorbing coefficient at the time when the through holes 3 are set to a large hole diameter d exceeding 0.8 mm, which is easy to process, cannot be made 0.4 or higher.

Selection of the material and the plate thickness of the perforated panel 2 be a material as thin as possible, lightweight and rigid including the viewpoint of reduction of weight and the sound absorbing effect. Regarding this point, it is preferable that the plate thickness of the perforated panel be a thin plate less than 0.5 mm.

Further, as the material, sheet steel, aluminum alloy plate, resin plate and the like can be appropriately used, but among others, preferably aluminum alloy plate, more preferably aluminum foil, that is, aluminum in particular is preferable on the point of reduction of weight and the sound absorbing effect.

(Air Layer)

The air layer 5 works as a resonance chamber of noise, and can efficiently absorb noise of a plurality of frequencies and noise of a specific frequency in combination with the through holes 3 of the perforated panel 2. It is preferable that the optimum thickness of the air layer 5 be selected from the range from 10 to 50 mm although it varies according to a using area of the sound absorbing structure, state of noise, or need for reducing noise. Further, it is preferable that air layer 5 be communicated only through the through holes 3 of the perforated panel 2 and the other portion be hermetically held by a shield member 8 arranged around it from the point of increasing the sound absorbing coefficient.

(Attaching of Sound Absorbing Structure)

The attaching method of the sound absorbing structure 1 of the present invention to the hood 6 is that, for example, it is fixed and unified to the periphery on the inner panel rear surface of the hood 6 by adhesive agent or a mechanical fastener such as bolt and nut while forming the air layer 5.

Note that it is not necessary that the sound absorbing structure 1 of the present invention entirely cover or cover the rear surface of the hood 6 or the inner panel rear surface. In other words, according to a using area in vehicle, state of noise, need of reducing noise, the sound absorbing structure 1 may be arranged on an appropriate position on the rear surface side of the hood 6 partially or dispersedly.

Figure 4:
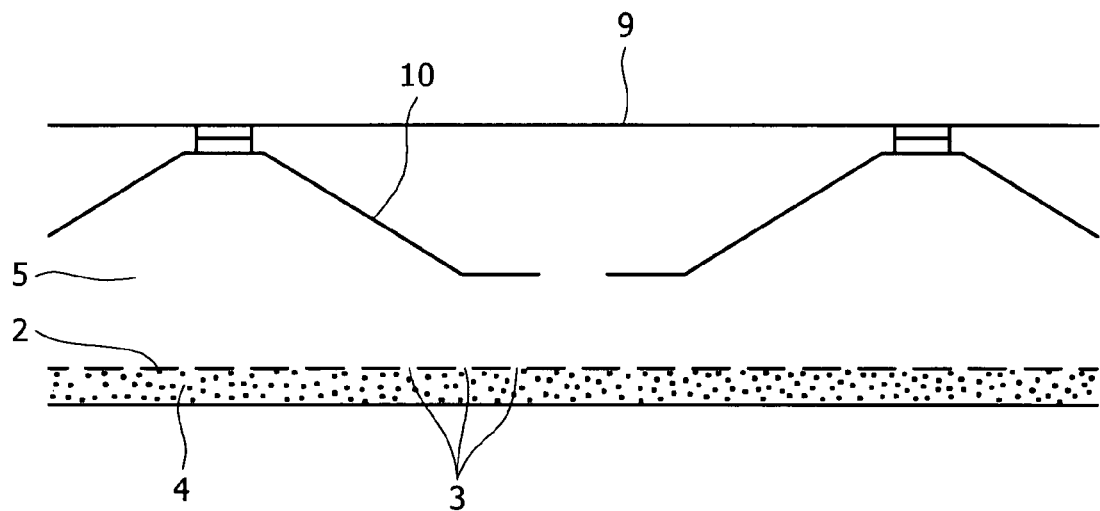
FIG. 4 is a sectional view showing another embodiment of the sound absorbing structure according to the present invention.

FIG. 4 to 9 show another mode of the attaching method of the sound absorbing structure 1 of the present invention to the hood. FIG. 4 shows a mode where the structure is equipped with the flat-plate-shaped fiber material 4, the flat-plate-shaped perforated panel 2, which has a large number of through holes 3 and is provided so as to be stacked on the fiber material 4, and an air layer 5 behind the perforated panel 2 in order from the engine sound source, in the case where an inner panel 10 of the hood is shaped in a concavo-convex shape of a so-called multi-cone type or the like having a large number of cone-shaped recesses. Note that the perforated panel 2 may be directly joined to the inner panel 10 of the hood after it is equipped with the rear air layer 5.

Figure 5:
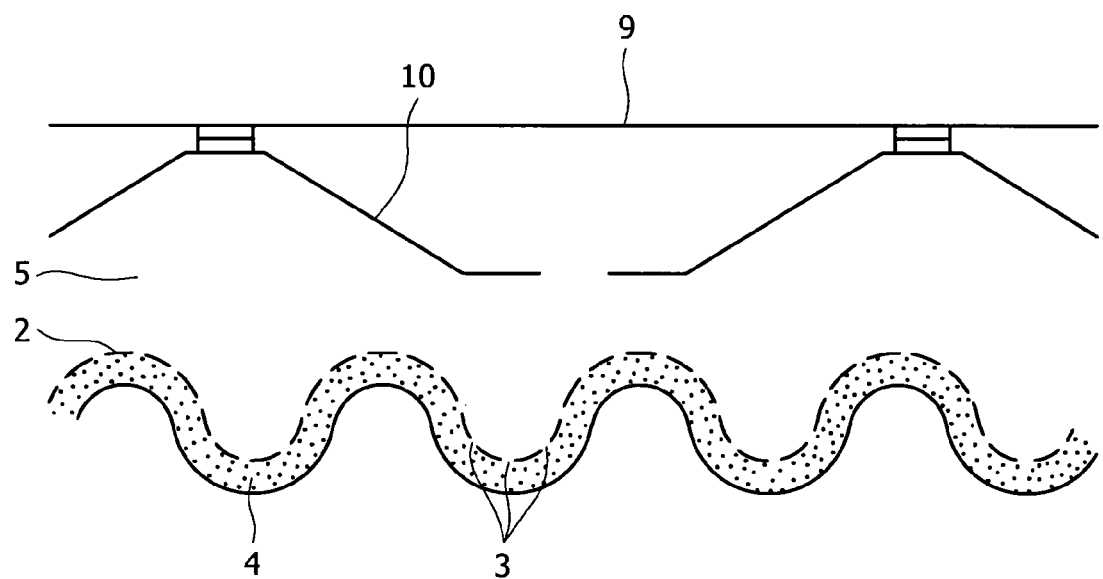
FIG. 5 is a sectional view showing another embodiment of the sound absorbing structure according to the present invention.
Figure 6:
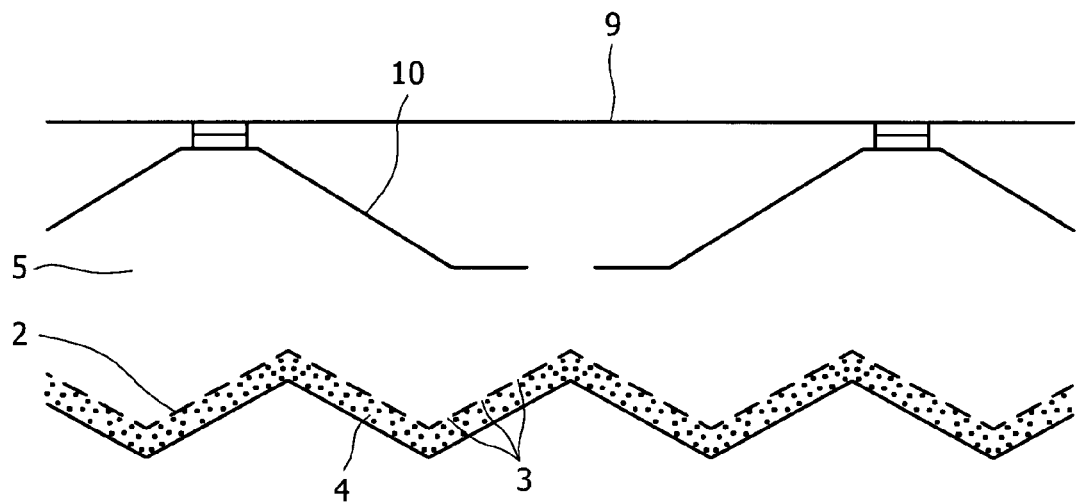
FIG. 6 is a sectional view showing another embodiment of the sound absorbing structure according to the present invention.
Figure 7:
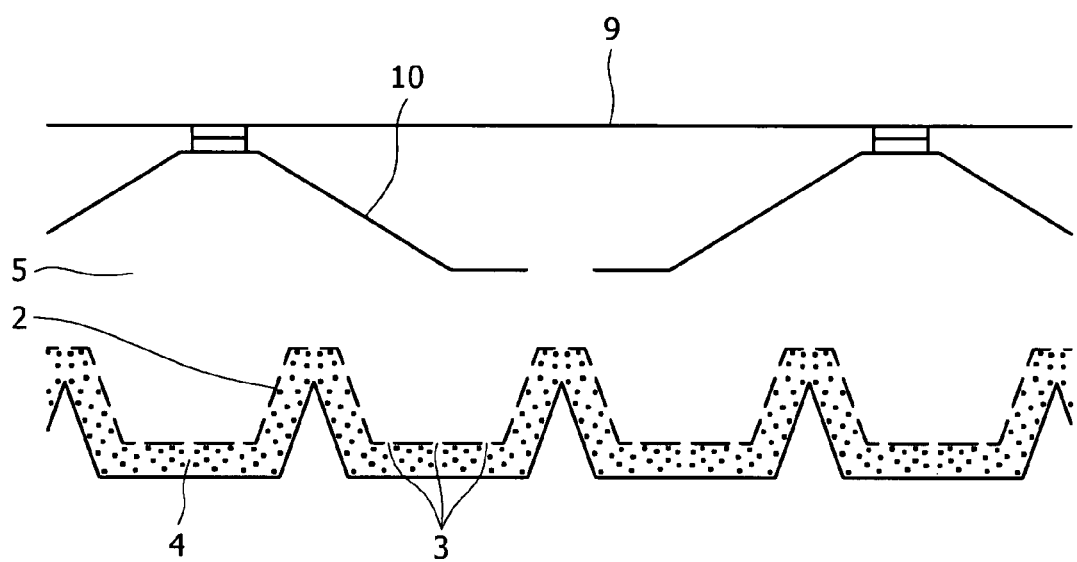
FIG. 7 is a sectional view showing another embodiment of the sound absorbing structure according to the present invention.

FIGS. 5, 6 and 7 show examples where they have the same basic constitution as FIG. 4 but concavo-convex is provided for the perforated panel 2 and the fiber material 4, which are provided in an overlapped manner, to increase rigidity. FIG. 5 is that arc-shaped concavo-convex in cross-section is continuously formed, FIG. 6 is that triangular concavo-convex in cross-section is continuously formed, and FIG. 7 is that trapezoidal concave portion in cross-section and triangular convex portion in cross-section is continuously formed.

FIGS. 8, 9, 10, 11 and 12 show examples where they have the same basic constitution as FIG. 4 but small gaps (air layer) are provided between the fiber material 4 and the perforated panel 2 when they are stacked. As described, in stacking the fiber material 4 and the perforated panel 2, the air layer may be provided between them.

Figure 8:
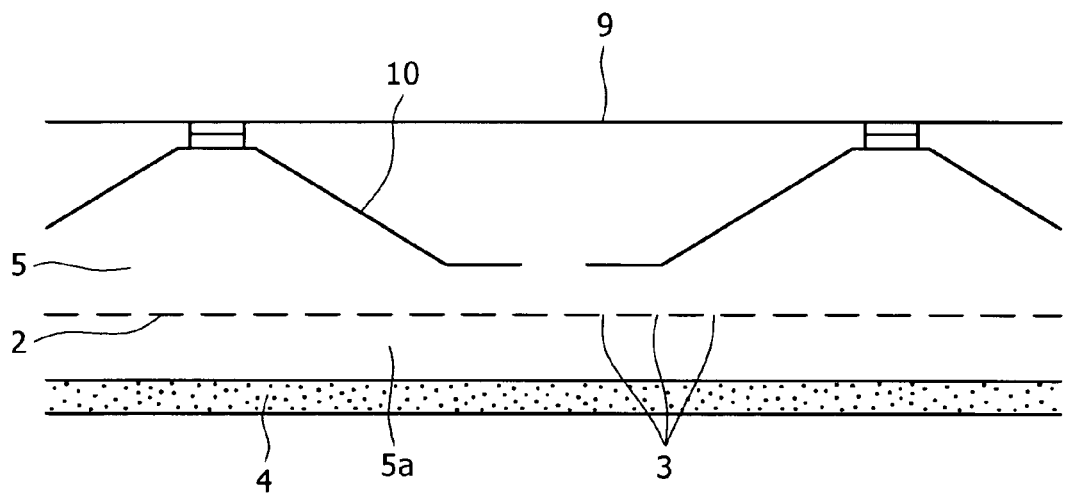
FIG. 8 is a sectional view showing another embodiment of the sound absorbing structure according to the present invention.
Figure 9:
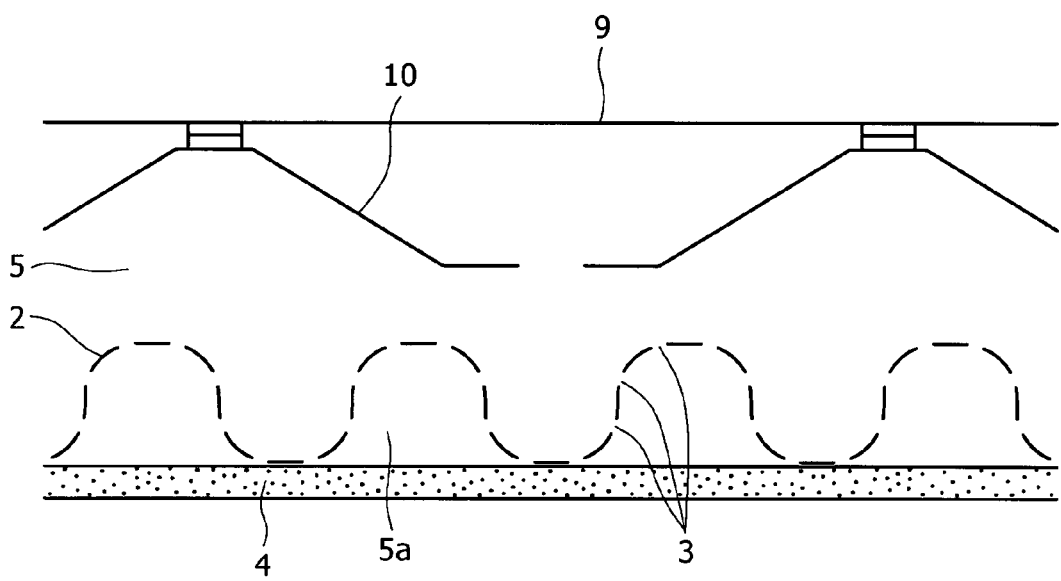
FIG. 9 is a sectional view showing another embodiment of the sound absorbing structure according to the present invention.
Figure 10:
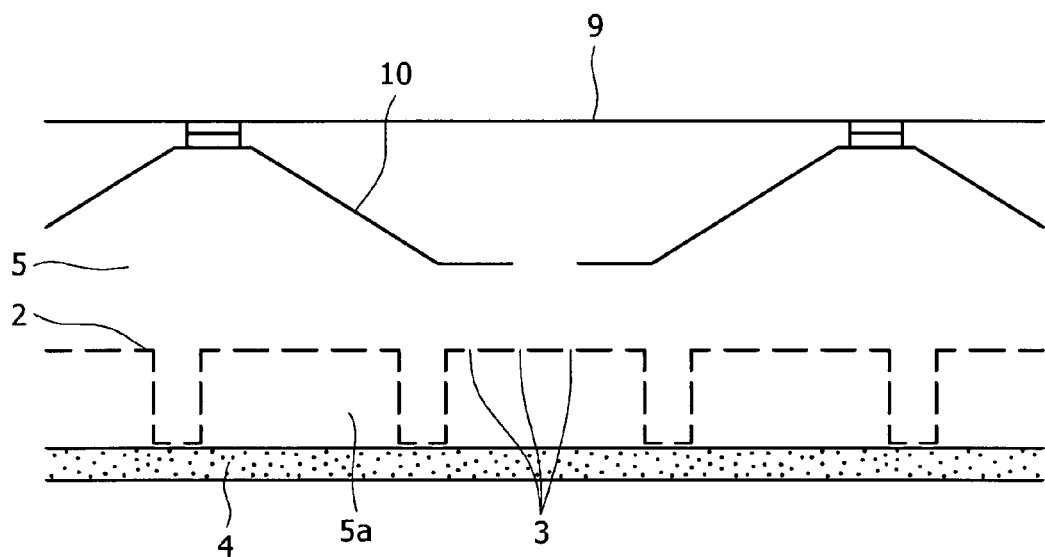
FIG. 10 is a sectional view showing another embodiment of the sound absorbing structure according to the present invention.
Figure 11:
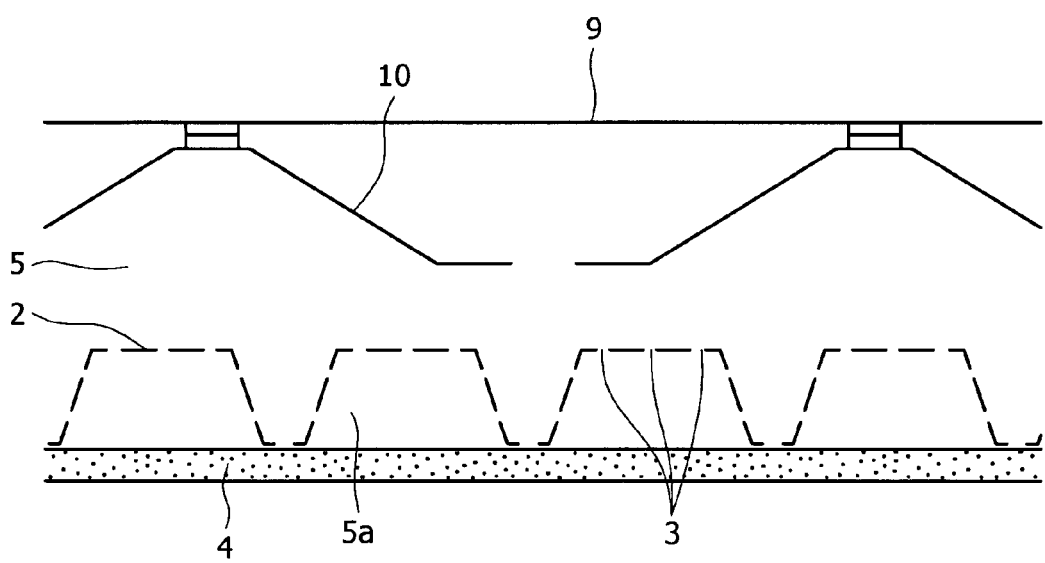
FIG. 11 is a sectional view showing another embodiment of the sound absorbing structure according to the present invention.
Figure 12:
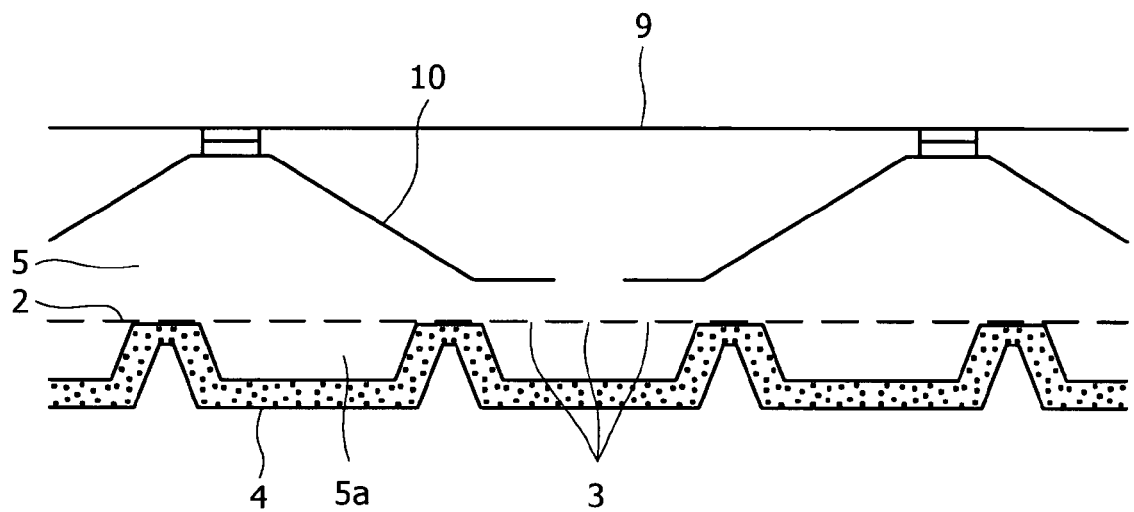
FIG. 12 is a sectional view showing another embodiment of the sound absorbing structure according to the present invention.

FIG. 8 is the example where the flat-plate-shaped fiber material 4 and the flat-plate-shaped perforated panel 2 are provided, in which an area between the fiber material 4 and the perforated panel 2 becomes a middle air layer 5a. FIGS. 9, 10 and 11 show examples where the flat-plate-shaped fiber material 4 and the concavo-convex-shaped perforated panel 2 are provided. In the case of FIGS. 9, 10 and 11, areas surrounded by the concavo-convex of the perforated panel 2 and flat-plate-shaped fiber material 4 become the middle air layer 5a. FIG. 12 shows an example where the concavo-convex-shaped fiber material 4 and the flat-plate-shaped perforated panel 2 are provided. In the case of FIG. 12, areas surrounded by the concavo-convex of the fiber material 4 and the flat-plate-shaped perforated panel 2 become the middle air layer 5a.

(Operation)

In the sound absorbing structure 1 of the present invention, to a sound source inside vehicle body such as an engine sound, the fiber material 4 is first arranged on the front face, and then, the perforated panel 2 and the air layer 5 are arranged in order.

As a result, in the sound absorbing structure 1 of the present invention, noise from the sound source such as an engine first collides the fiber material 4 arranged on the front face, for example. For this reason, noise is absorbed while it passes through the porous portion of the fiber material 4 corresponding to sound absorbing characteristics of the fiber material 4, residual noise that has not been absorbed transmits the hole portions of the fiber material 4.

In this occasion, as described above, the fiber material 4 has a relationship that the density ρ of the fiber material (kg/m³) and the thickness t of the fiber material (mm) satisfy Equation (1), particularly, the sound absorbing coefficient can be made 0.4 or higher even in the case of the perforated panel 2 where the through holes 3 are set to a large hole diameter d exceeding 0.8 mm, which is easy to process.

Residual noise having transmitted the fiber material 4 is subsequently introduced into the air layer 5 via (by transmitting) the through holes 3 portion of the perforated panel 2. Then, the through holes 3 of the perforated panel 2 work as the resonance hole of noise, the air layer 5 also works as the resonance chamber of noise, and noise in specific frequency can be efficiently absorbed. Further, by arranging the fiber material 4 on the surface of the perforated panel 2, attenuation of the fiber material 4 is added to the sound absorbing operation by the through holes 3 of the perforated panel, thus achieving higher sound absorbing performance than the constitution only by the perforated panel 2.

Note that the above-described sound absorbing effect is similarly exerted when the perforated panel 2 instead of the fiber material 4 is arranged first on the front face to the sound source inside a vehicle body such as engine sound as described above, the fiber material 4 is arranged subsequently behind the perforated panel 2 so as to be stacked on it, and then the air layer 5 is arranged behind the fiber material 4 in order.

In this occasion, it is assumed that the hole diameter d (mm) of each through hole 3 in the perforated panel 2 and the aperture ratio β(%) of through holes, which is a ratio of a total area of the hole diameter d in all through holes to the surface area of the perforated panel 2, satisfy Equation (2) above.

As a result, particularly, the sound absorbing coefficient can be made 0.4 or higher even in the case of the perforated panel 2 where the through holes 3 are set to a large hole diameter d exceeding 0.8 mm, which is easy to process.

Since the sound absorbing structure 1 of the present invention has such constitutions and operations, it is possible to multiply the effects of the fiber material 4, the perforated panel 2 and the air layer 5. Specifically, even in the case where the thin aluminum foil is used as the perforated panel 2 and the through holes 3 are set to the large hole diameter d exceeding 0.8 mm, the sound absorbing performance in a wide frequency and the sound absorbing performance in a specific frequency can be remarkably improved comparing to the sound absorbing effect in the case of single each sound absorbing means as in examples described later. Thus, weight of the sound absorbing structure itself can be made lighter, and the through holes of the perforated panel can be easily processed. Therefore, increase of the weight of vehicle body and the increase of vehicle body cost due to the addition of the sound absorbing structure can be suppressed to the minimum.

EXAMPLES

Next, examples of the present invention will be described. The sound absorbing structure 1 having the shape structure shown in FIG. 1 was prepared, $\rho$ and t of the fiber material in Equation (1) were changed, a relationship between the hole diameter and the aperture ratio of the perforated panel, at which the sound absorbing coefficient of 0.4 or higher can be achieved was found from Equation (2).

Regarding the sound absorption measurement, the sound absorbing coefficient was measured using a sounding tube. First, one end of the sounding tube was used as rigid wall plate (simulated hood panel), and a speaker being a sound source was arranged on the other end. The fiber material 4 was placed upright in front of the speaker with a fixed gap provided, an aluminum foil in which multiple holes were formed, which is the perforated panel 2, was placed upright so as to overlap behind the fiber material 4, and air layer 5 was allowed to exist in the rigid wall surface behind the perforated panel 2. Then, by transmitting sound wave from the speaker and by measuring sound pressure by two microphones in the vicinity of a sound absorbing structure test specimen, ratio between incident wave and reflected wave was found, and sound absorbing coefficient was calculated.

As a test condition, the frequency of noise was set to a range from 800 to 4000 Hz including low frequency to high frequency, the perforated panel was the aluminum foil having the thickness of 80 µm (0.08 mm), the thickness of the air layer was set to 35 mm.

Figure 13:
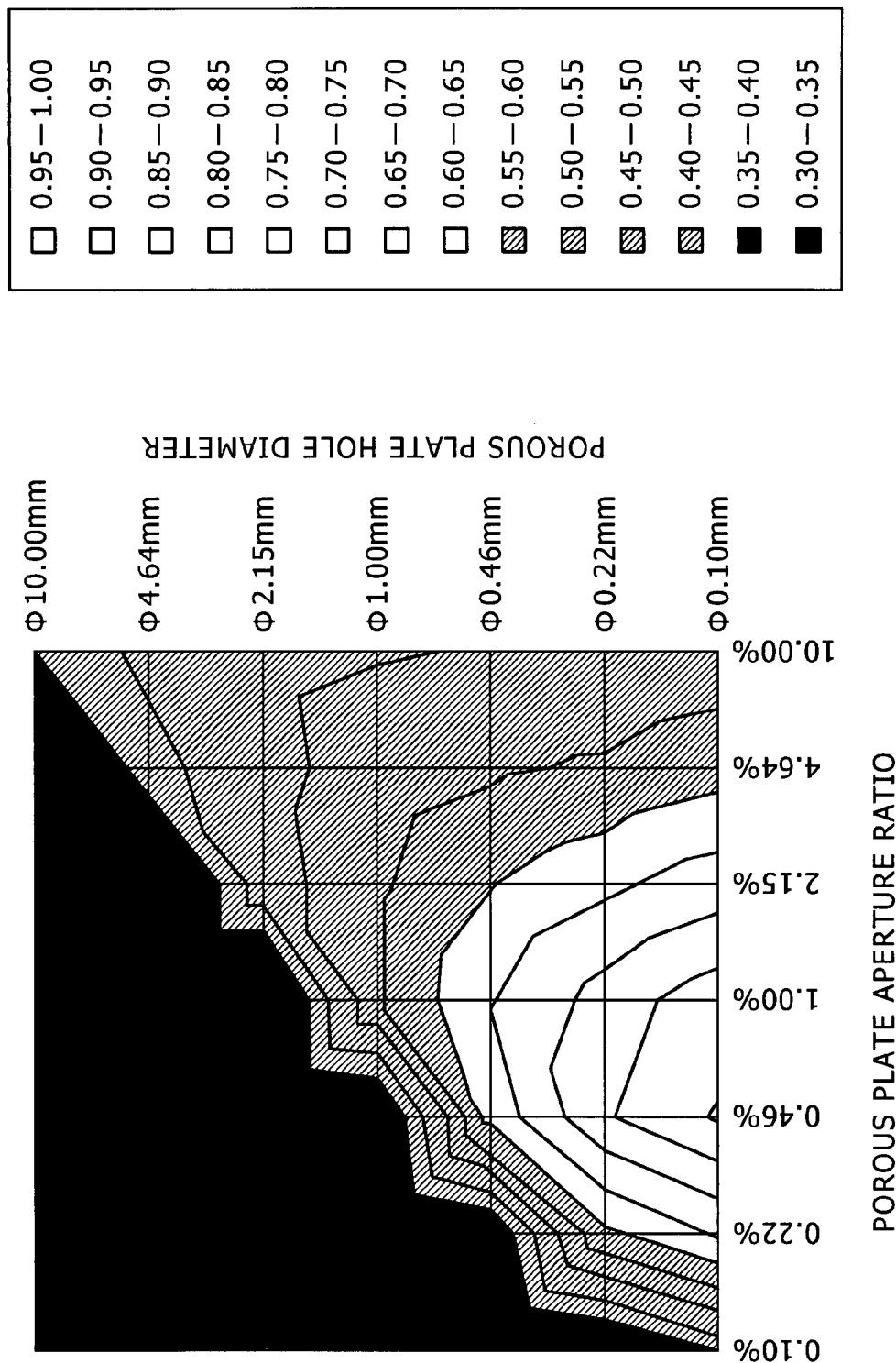
FIG. 13 is an explanatory view showing the sound absorbing effect of the sound absorbing structure according to the present invention.
Figure 14:
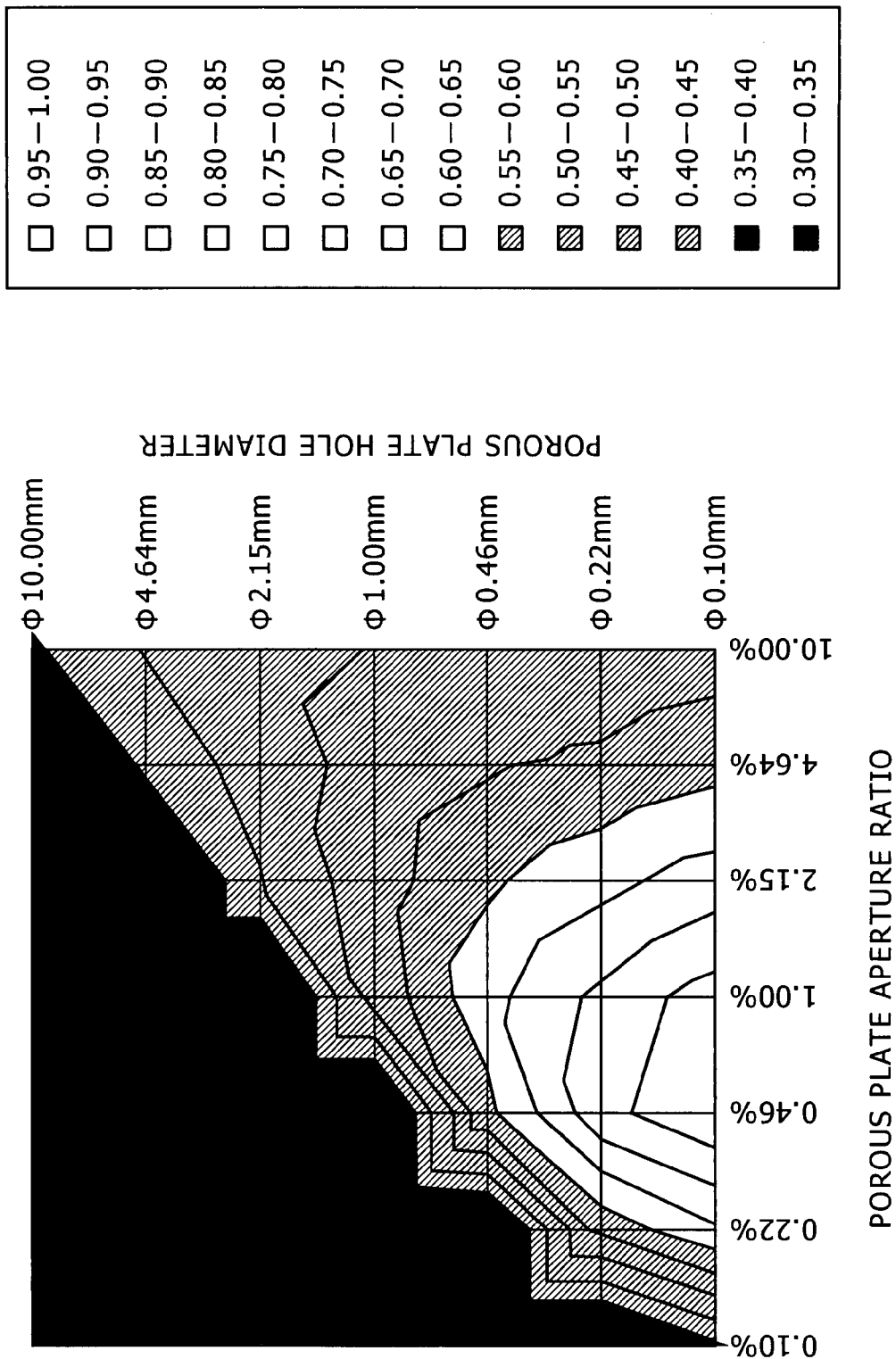
FIG. 14 is an explanatory view showing the sound absorbing effect of the sound absorbing structure according to the present invention.
Figure 15:
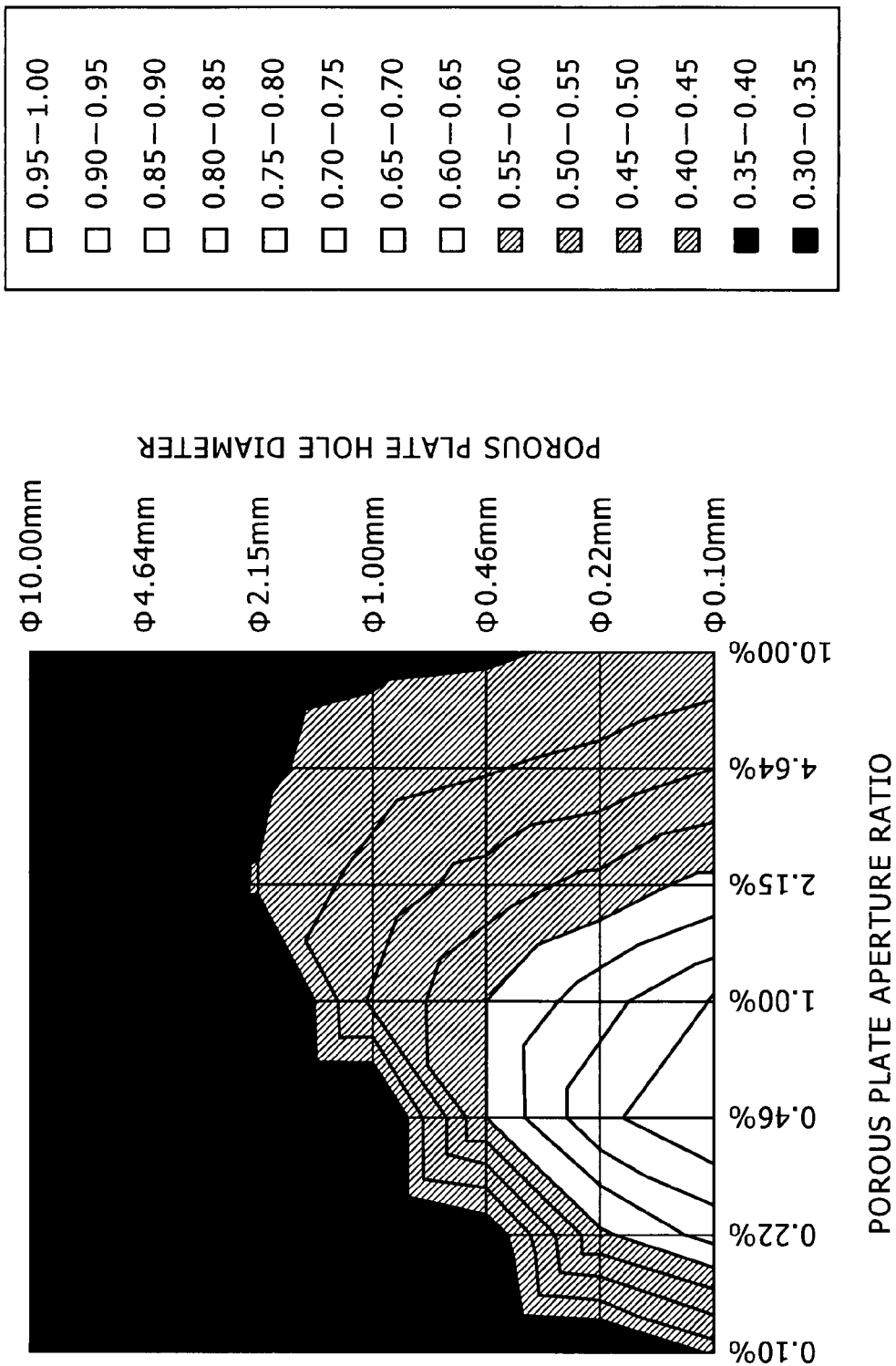
FIG. 15 is an explanatory view showing the sound absorbing effect of the sound absorbing structure according to the present invention.
Figure 16:
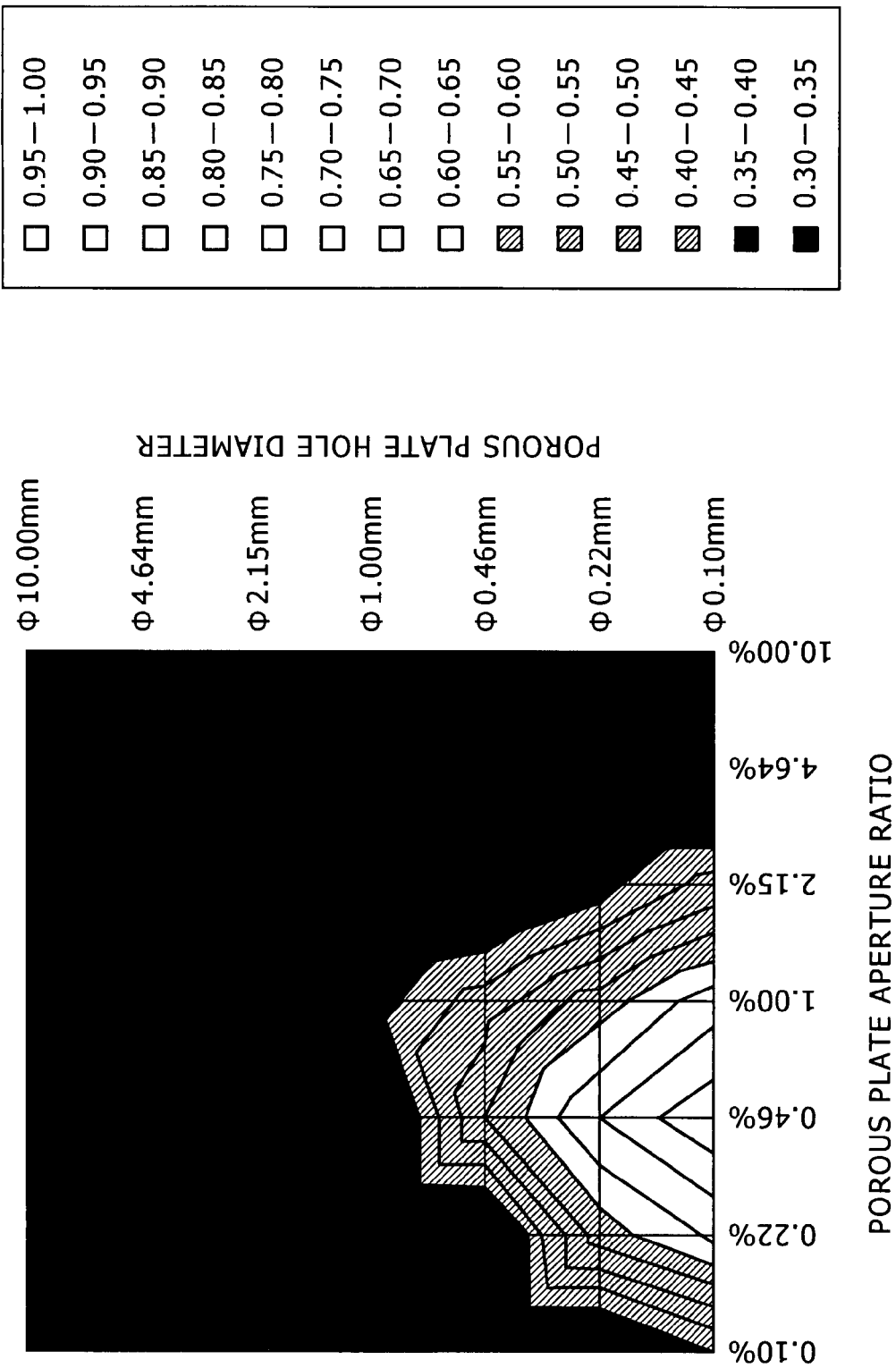
FIG. 16 is an explanatory view showing the sound absorbing effect of the sound absorbing structure of a comparative example.

FIGS. 13, 14, 15 and 16 show the results. FIGS. 13, 14 and 15 are invention examples, FIG. 16 shows a comparative example where the fiber material was not provided in FIG. 1 but only the perforated panel and the rear air layer were provided. In each drawing, axis of ordinates shows the hole diameter of the perforated panel and axis of abscissas shows the aperture ratio of the perforated panel. Further, in each drawing, a white area is an area where the sound absorbing coefficient reaches 0.6 or higher, a gray area is an area where the sound absorbing coefficient reaches 0.4 to 0.6, and a black area is an area where the sound absorbing coefficient becomes less than 0.4.

Invention Example

FIG. 13

Glass wool was used as the fiber material, density $\rho$: 80 kg/m$^3$ and thickness t: 2 mm were set, and $\rho \times t = 0.16$ kg/m$^2$ was set so as to satisfy $\rho \times t \geq 0.01$ kg/m$^2$ of Equation (1). FIG. 13 shows that an area(range) reaching the sound absorbing coefficient of 0.6 or higher has spread even if the hole diameter of the perforated panel is $\phi 0.5$ mm or larger.

Invention Example

FIG. 14

Felt was used as the fiber material, density $\rho$: 250 kg/m$^3$ and thickness t: 0.64 mm were set, and $\rho \times t = 0.16$ kg/m$^2$ was set so as to satisfy $\rho \times t \geq 0.01$ kg/m$^2$ of Equation (1). FIG. 14 shows that an area(range) reaching the sound absorbing coefficient of 0.6 or higher has spread even if the hole diameter of the perforated panel is $\phi 0.5$ mm or larger.

Invention Example

FIG. 15

Rock wool was used as the fiber material, density $\rho$: 138 kg/m$^3$ and thickness t: 1.2 mm were set, and $\rho \times t = 0.16$ kg/m$^2$ was set so as to satisfy $\rho \times t \geq 0.01$ kg/m$^2$ of Equation (1). FIG. 15 shows that an area(range) reaching the sound absorbing coefficient of 0.6 or higher has spread even if the hole diameter of the perforated panel is $\phi 0.5$ m or larger.

Comparative Example

FIG. 16

This is a case having no fiber material, and $\rho \times t \geq 0.01$ kg/m$^2$ of Equation (1) is not satisfied. As a result, FIG. 16 shows that an area(range) reaching the sound absorbing coefficient of 0.6 or higher is drastically small comparing to the above-described invention examples, and the sound absorbing coefficient does not become 0.6 or higher at the hole diameter of the perforated panel is $\phi 0.5$ mm or larger. Therefore, it is necessary to provide holes of small diameter, whose processing is more difficult, in the perforated panel in order to increase the sound absorbing coefficient.

(Another Mode for Carrying Out the Invention)

In the following, other modes for carrying out the invention will be described.

(Fiber Material)

In the fiber material 4 of FIGS. 1 to 12, due to the adjustment of the characteristics of the sound absorbing effect, rigidity or the like or fabrication and attachment of the fiber material, the fiber material 4 may be not only one layer but also a multilayer structure made up of two or more layers of fiber material. In the case of making the fiber material 4 have such a multilayer structure, same materials may be laminated, different materials may be laminated, or alternatively, these laminations may be laminated in combination according to an object.

Furthermore, the fiber material 4 is not limited to a multilayer array in a direction toward such a sound source (advance direction of sound wave), but different fiber materials or fiber materials of different sound absorbing coefficients may be appropriately arrayed within the same layer or the same plane to the sound source (within a horizontal plane or within a perpendicular plane depending on the orientation of the sound absorbing structure). With this mode, since areas having different sound absorbing coefficients within the same layer or the same plane to the sound source exist, sound absorbing effect can be obtained in a wide frequency band.

(Bonding Type Perforated Panel)

In the perforated panel 2 of FIGS. 1 to 12, in the case of using a thin material such as the aluminum porous foil, the perforated panel 2 is not made be a single aluminum porous foil but different materials may be laminated to this. For example, when the fiber material made of nonwoven fabric cloth and fiber of felt, glass wool, rock wool or the like is bonded to the aluminum porous foil into the perforated panel 2, the perforated panel 2 can have rigidity and thickness.

Then, the fiber material side made of the above-described nonwoven fabric cloth and fiber of the bonding type perforated panel 2 and the fiber material 4 are adhered with adhesive agent, it is not necessary to coat adhesive agent on the aluminum porous foil side. For this reason, there is an advantage that the porous portions of the aluminum foil are not clogged by adhesive agent, and the perforated panel 2 and the fiber material 4 can be bonded without reducing the sound absorbing effect.

Furthermore, the bonding type perforated panel 2 has an advantage of easiness of perforating processing. Specifically, the fiber material made of the above-described nonwoven fabric cloth and fiber is bonded to an un-perforated aluminum foil in advance, perforating processing for sound absorption is performed to the bonded aluminum foil into the aluminum porous foil (perforated panel 2). According to such a mode, the foil can have rigidity and thickness which are necessary in the perforating processing, and the perforating processing itself becomes easier than performing the perforating processing to a very thin single aluminum foil.

Therefore, in the sound absorbing structure 1 of FIGS. 1 to 12 as well, bonding of the fiber material 4 and the perforated panel 2 may be mechanical bond, but it is done simply by the above-described adhesive agent.

(Sound Absorbing Performance of Bonding Type Perforated Panel)

Figure 17:
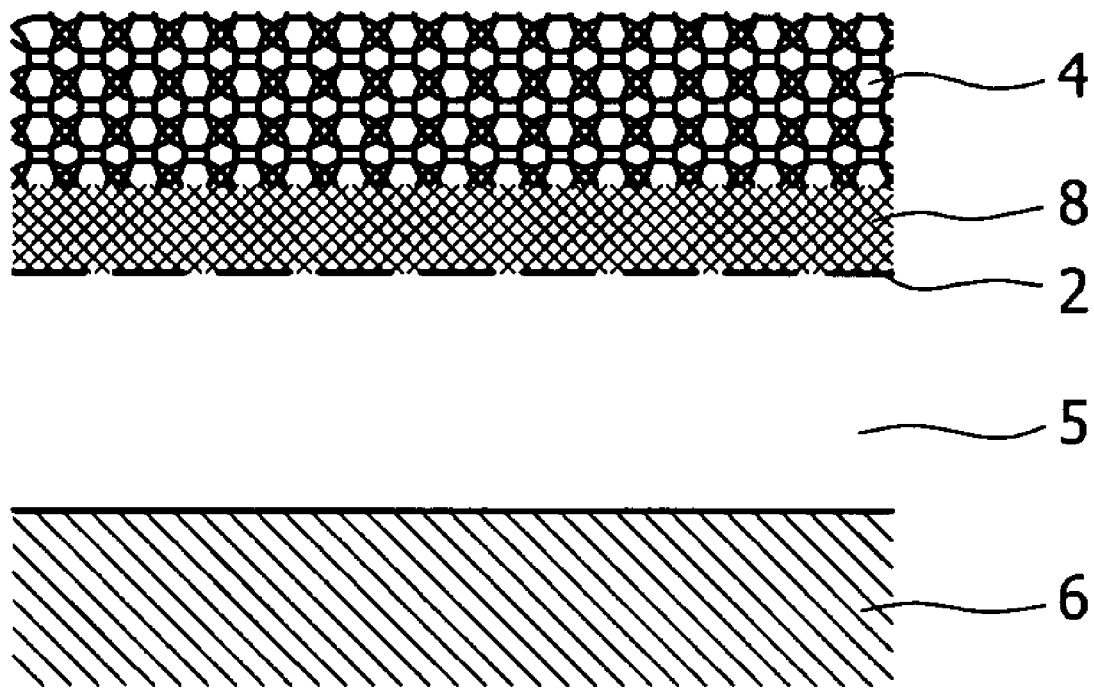
FIG. 17 is a sectional view showing another mode of the sound absorbing structure according to the present invention.

FIG. 17 shows an example of the bonding type perforated panel. In the sound absorbing structure of FIG. 17, the nonwoven fabric cloth 8 is bonded to the aluminum porous foil 2 into a perforated panel, and glass wool as the fiber material 4 is bonded to this. FIGS. 18 to 21 show the sound absorbing performance (sound absorbing coefficient) in the case where the thickness condition of each portion of the sound absorbing structure of FIG. 17 was changed. The measurement method and the test condition of the sound absorbing structure and the sound absorbing coefficient were performed in the same manner as the above-described examples. In FIGS. 18 to 21, $\rho$ and t of the fiber material 4 in Equation (1) were changed in the same manner as FIGS. 13 to 16, and the relationship between the hole diameter and the aperture ratio of the perforated panel, at which the sound absorbing coefficient of 0.4 or higher can be achieved is found from Equation (2).

Figure 18:
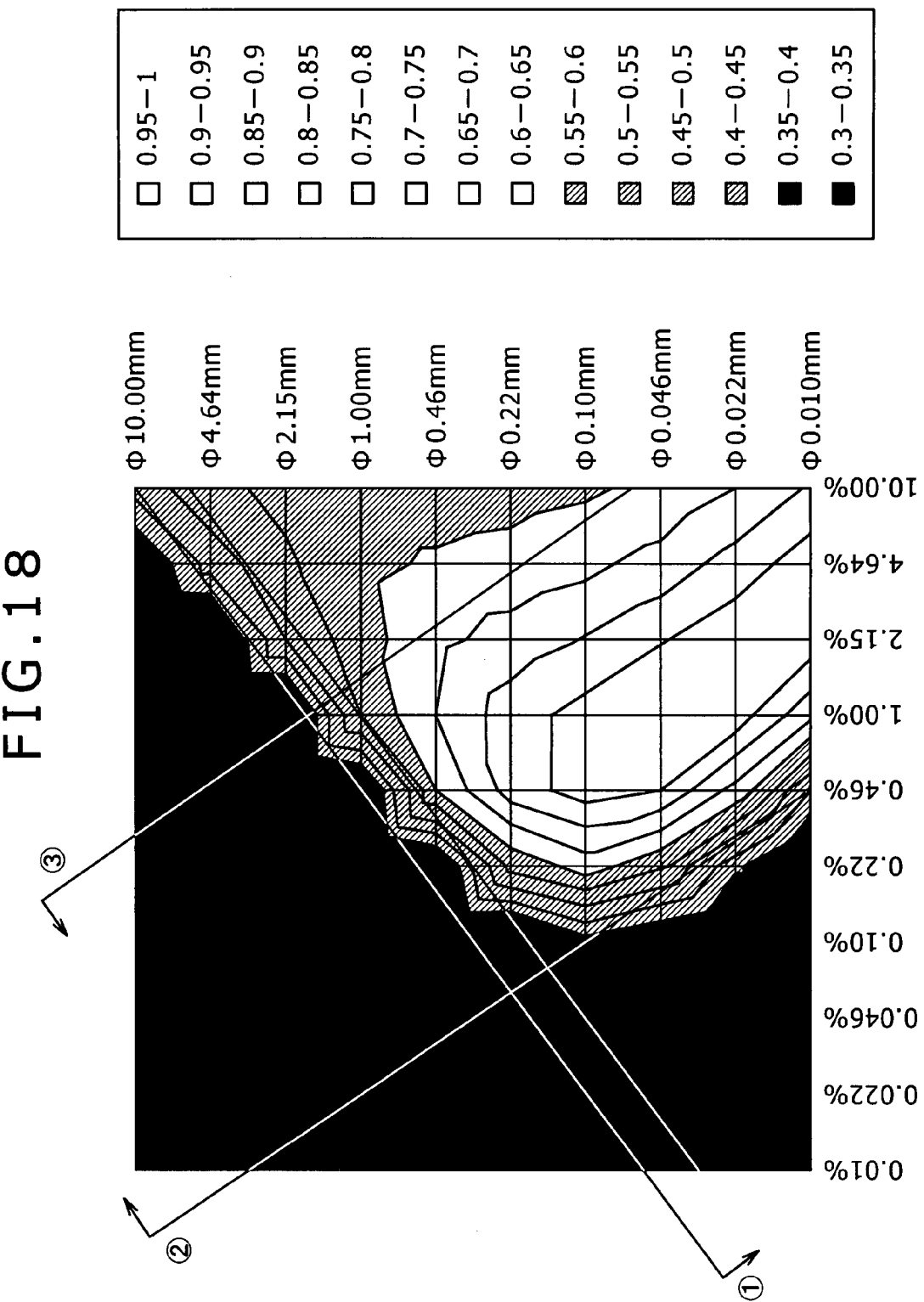
FIG. 18 is an explanatory view showing the sound absorbing effect of the sound absorbing structure according to the present invention.
Figure 19:
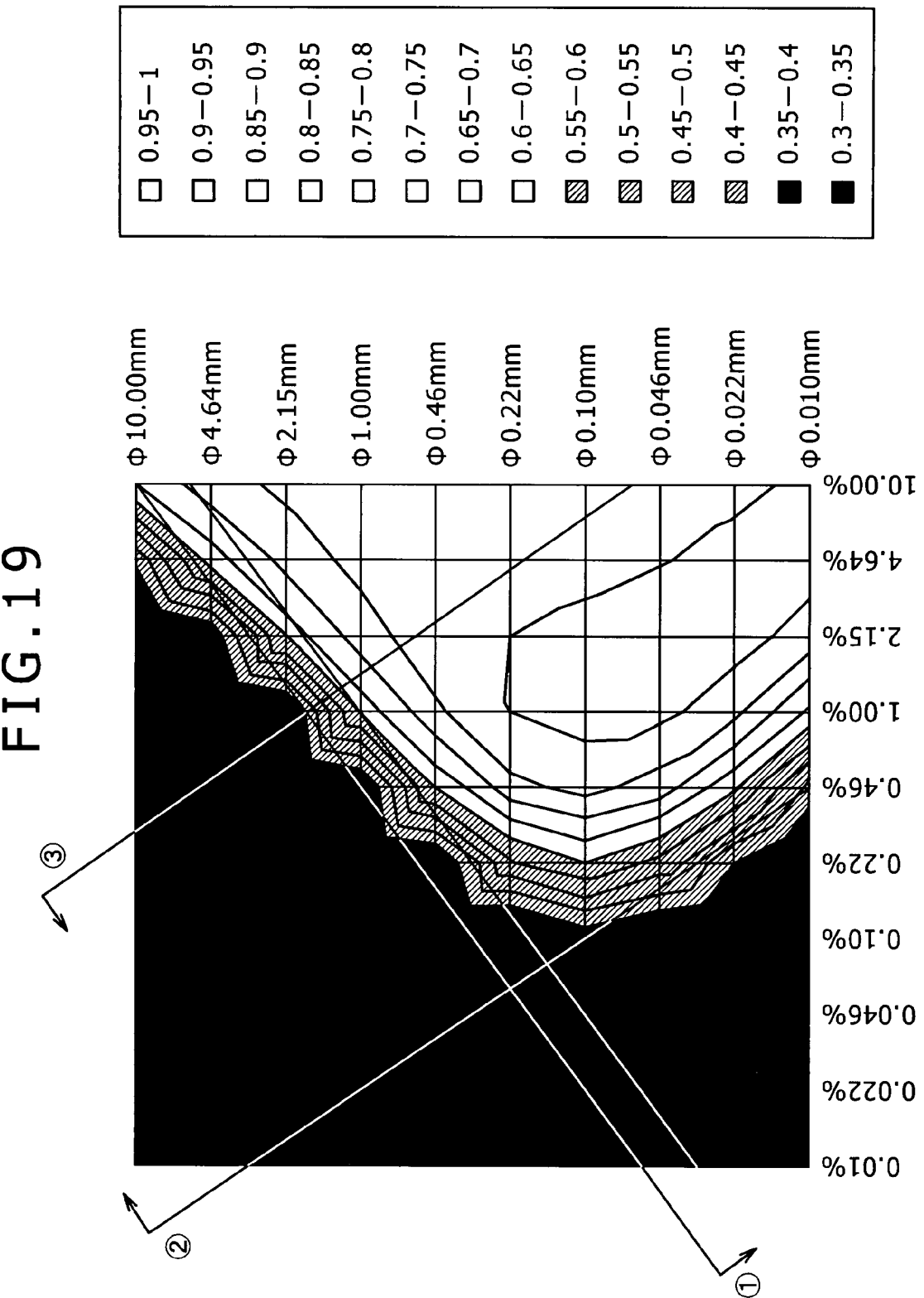
FIG. 19 is an explanatory view showing the sound absorbing effect of the sound absorbing structure according to the present invention.

In the sound absorbing structure of FIG. 18 and FIG. 19, the fiber material made of the above-described nonwoven fabric cloth and fiber having the thickness of 0.1 mm (surface density: 40 g/m$^2$) was bonded to the aluminum porous foil having the thickness of 80 μm (0.08 mm) into a perforated panel. Then, glass wool having the density $\rho$: 80 kg/m$^3$ and thickness t: 2 mm (FIG. 18) or 5 mm (FIG. 19) as the fiber material 4 was bonded to it. The entire thickness of the sound absorbing structure including the air layer behind the perforated panel was set to 35 mm.

Figure 20:
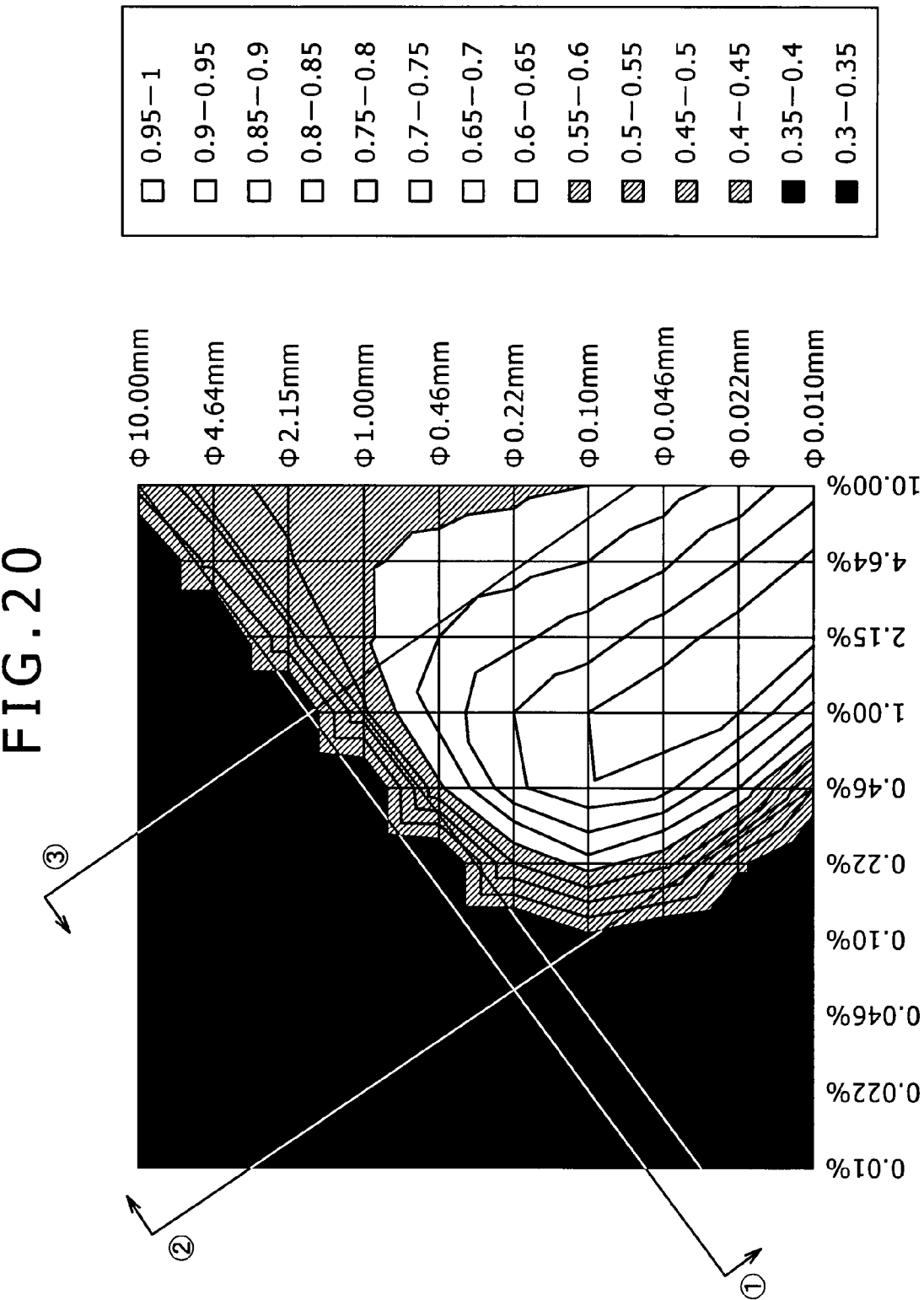
FIG. 20 is an explanatory view showing the sound absorbing effect of the sound absorbing structure according to the present invention.

The sound absorbing structure of FIG. 20, glass wool having the thickness of 2 mm (density: 80 kg/m$^3$) was bonded to the aluminum porous foil having the thickness of 80 μm (0.08 mm) into a perforated panel, and glass wool having the density $\rho$: 32 kg/m$^3$ and thickness t: 2 mm as the fiber material 4 was bonded to it. The entire thickness of the sound absorbing structure including the air layer behind the perforated panel was set to 35 mm.

Figure 21:
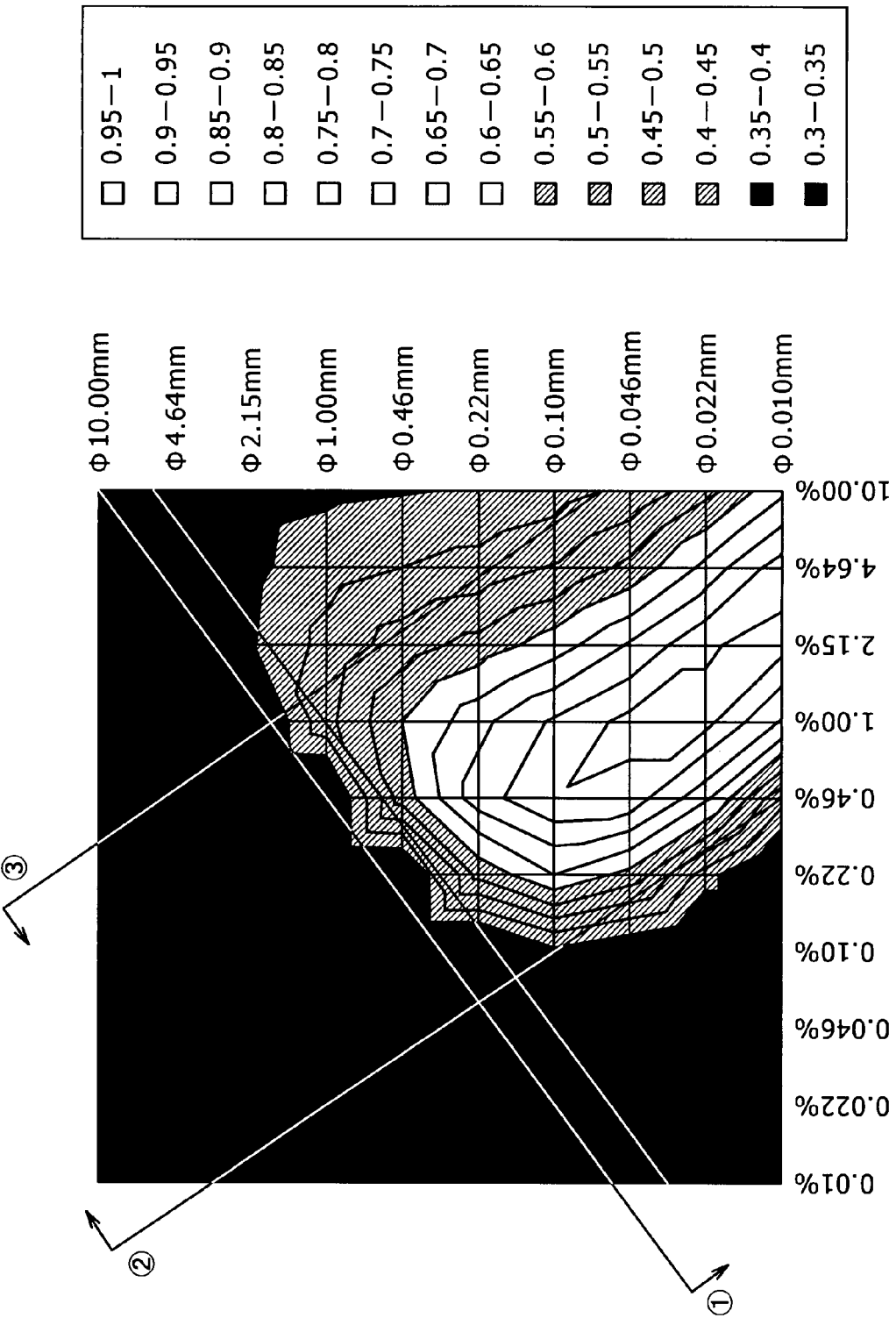
FIG. 21 is an explanatory view showing the sound absorbing effect of the sound absorbing structure according to the present invention.

The sound absorbing structure of FIG. 21, glass wool having the thickness of 1 mm (density: 80 kg/m$^3$) was bonded to the aluminum porous foil having the thickness of 80 μm (0.08 mm) into a perforated panel, and glass wool having the density $\rho$: 32 kg/m$^3$ and thickness t: 1 mm as the fiber material 4 was bonded to it. The entire thickness of the sound absorbing structure including the air layer behind the perforated panel was set to 35 mm.

In each drawing of FIGS. 18 to 21, axis of ordinates shows the hole diameter of the perforated panel and axis of abscissas shows the aperture ratio of the perforated panel. Further, in each drawing, the white area is an area where the sound absorbing coefficient reaches 0.6 or higher, the gray area is an area where the sound absorbing coefficient reaches 0.4 to 0.6, and the black area is an area where the sound absorbing coefficient becomes less than 0.4. Each drawing shows that the area (range) where the sound absorbing coefficient reaches 0.6 or higher has spread even if the hole diameter of the perforated panel is ϕ0.5 mm or larger.

In the mode of such a bonding type perforated panel, regarding the fiber material 4 of the perforated panel and the fiber material bonded to the perforated panel, which is made of nonwoven fabric cloth and fiber such as the glass wool 8, the total value of the surface density $\rho \times t$ in all layers of the fiber materials is allowed to satisfy $\rho \times t \geq 0.01$ kg/m$^2$ of Equation (1). The same applies to the mode of FIGS. 18 to 21 and modes to be described later as well.

Meanwhile, in this case, if either layer of the layer of the fiber material 4 or the layer of the fiber material made of nonwoven fabric cloth and fiber such as the above-described glass wool 8 satisfies $\rho \times t \geq =0.01$ kg/m$^2$ of Equation (1), naturally, the total value of the surface density $\rho \times t$ of all layers of the fiber material satisfies $\rho \times t \geq 0.01$ kg/m$^2$. Therefore, in other words, if either one layer of the fiber material satisfies $\rho \times t \geq 0.01$ kg/m$^2$, the other fiber material may not satisfy $\rho \times t \geq 0.01$ kg/m$^2$.

On the other hand, regarding a preferable range of the density $\rho$ (10 to 400 kg/m$^3$) of the above-described fiber material, it is preferable that each fiber material layer be in the range severally in the mode of such a bonding type perforated panel. The modes in FIGS. 18 to 21 above satisfy this.

Figure 22:
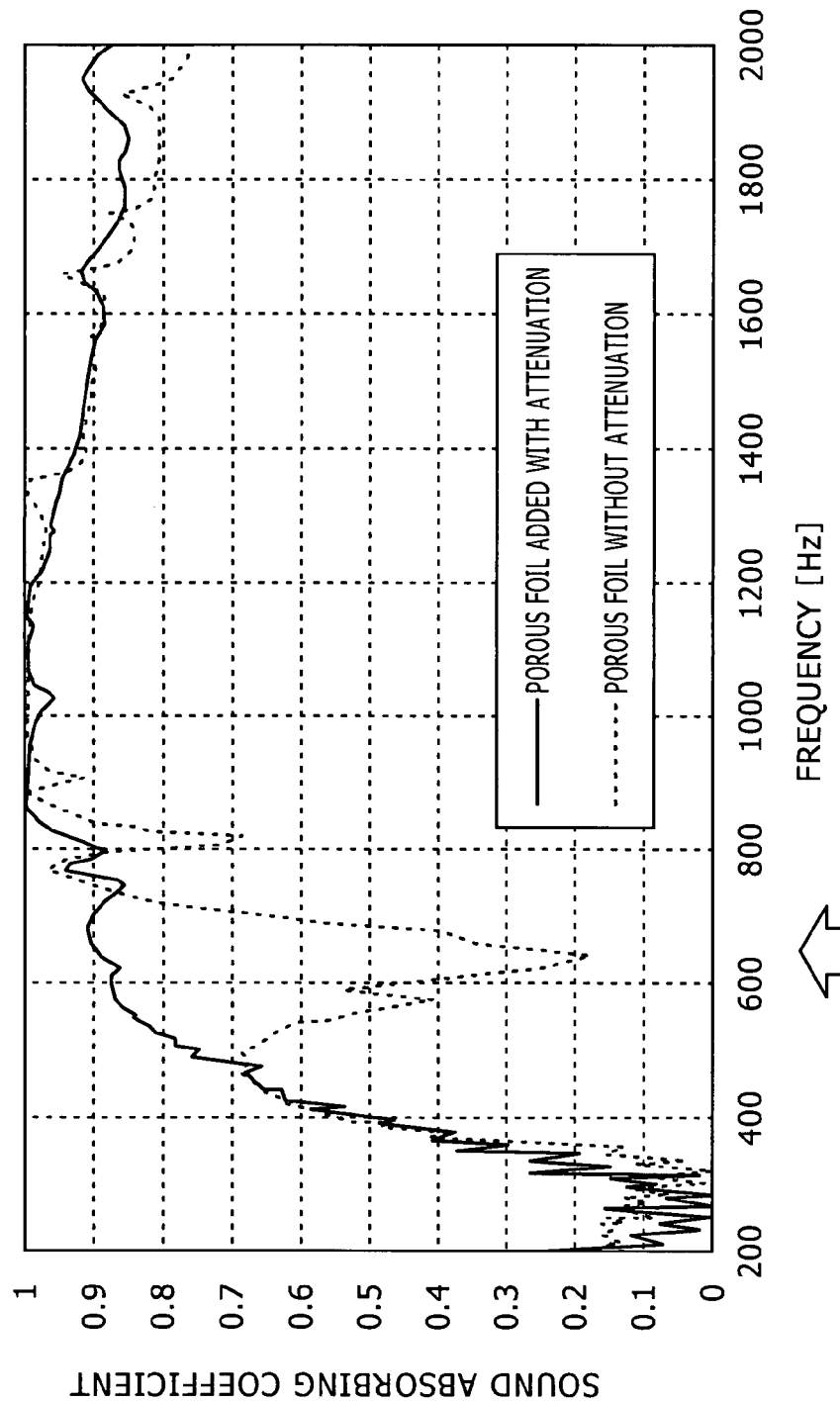
FIG. 22 is an explanatory view showing the sound absorbing effect of the sound absorbing structure according to the present invention.

FIG. 22 shows changes of the sound absorbing coefficient (axis of ordinates) caused by the frequency of sound wave (axis of abscissas) between the perforated panel of FIG. 17 (a perforated panel where nonwoven fabric cloth was bonded to the aluminum porous foil to add structural attenuation) and a perforated panel made of only the aluminum porous foil to which structural attenuation is not added. The perforated panel added with structural attenuation (thick line) does not have drastic reduction in the sound absorbing coefficient by the frequency of sound wave. On the contrary, in the perforated panel that is not added with structural attenuation (light line), the sound absorbing coefficient is drastically reduced at the frequency around 500 to 700 Hz. This is caused by the fact that the above-described resonance of the perforated panel is generated in the frequency band.

(Sandwiching of Perforated Panel Between Fiber Materials)

Figure 23:
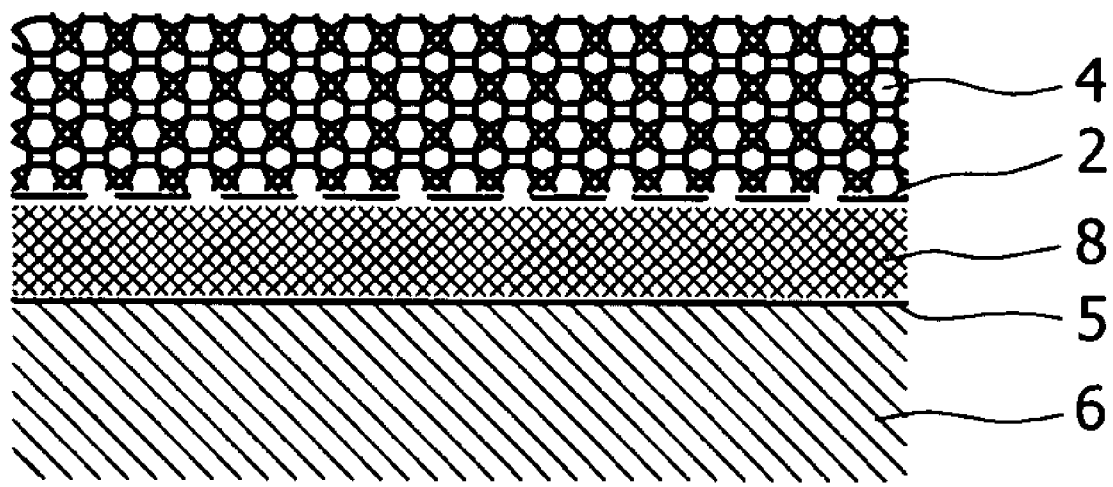
FIG. 23 is a sectional view showing another mode of the sound absorbing structure according to the present invention.

In the case where the fiber material 4 is formed in the above-described multilayer structure, in bonding the fiber material 4 and the perforated panel 2, when the perforated panel (porous foil) 2 is inserted between the layer of the fiber material 4, which on the front side to the sound wave, and the layer of the fiber material 8, which is on the rear side to the sound wave, or perforated panel 2 is provided between the layers of the fiber materials (4, 8) so as to be sandwiched as shown in FIG. 23, transmission loss becomes larger than the case of only the fiber material 4, the sound insulating property improves. Then, such a structure does not affect the sound absorbing coefficient much and does not reduce the sound absorbing coefficient. Therefore, it is preferable to employ such a mode for an application where the sound insulating property is required.

Figure 24:
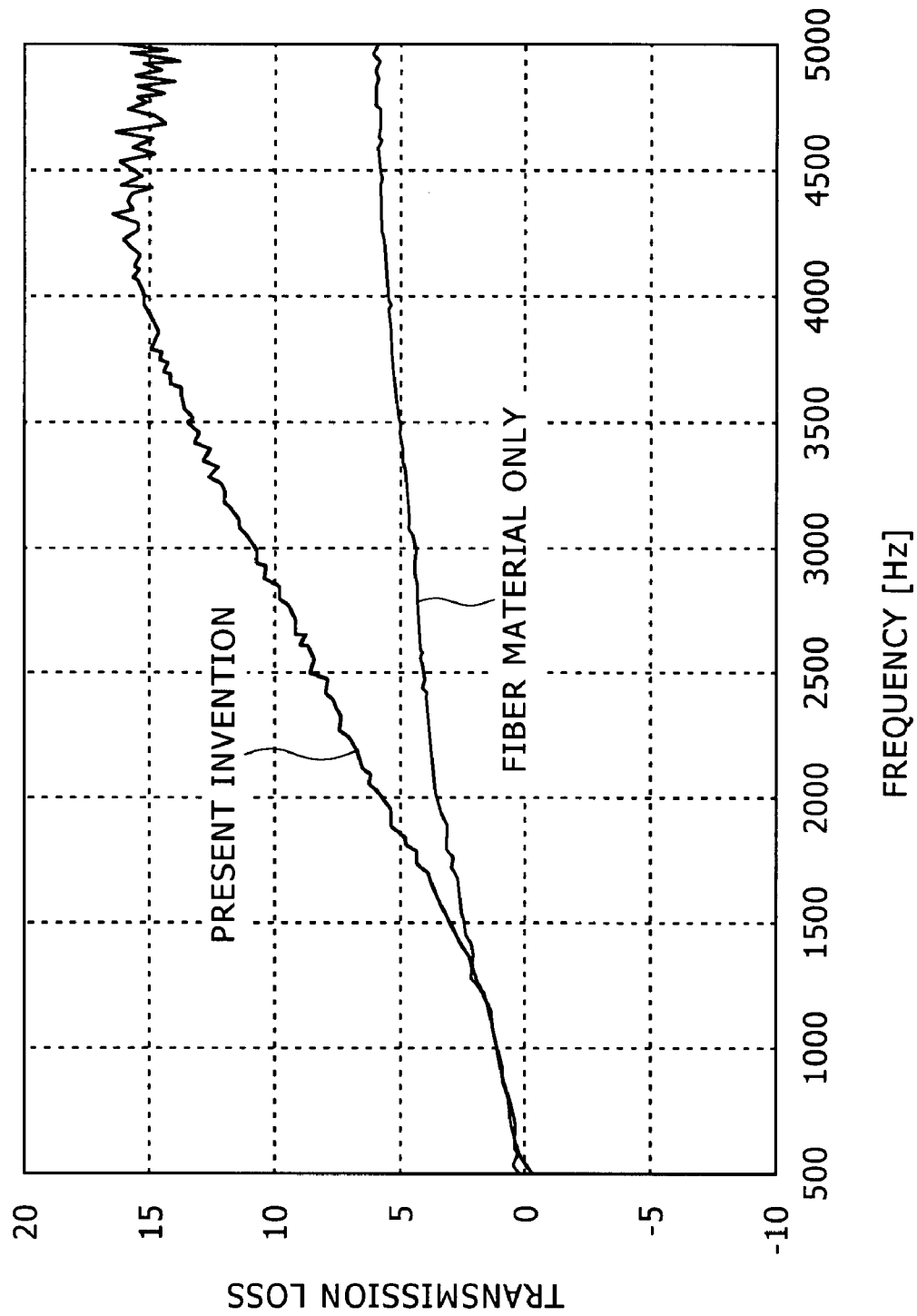
FIG. 24 is an explanatory view showing the sound absorbing effect of the sound absorbing structure according to the present invention.
Figure 25:
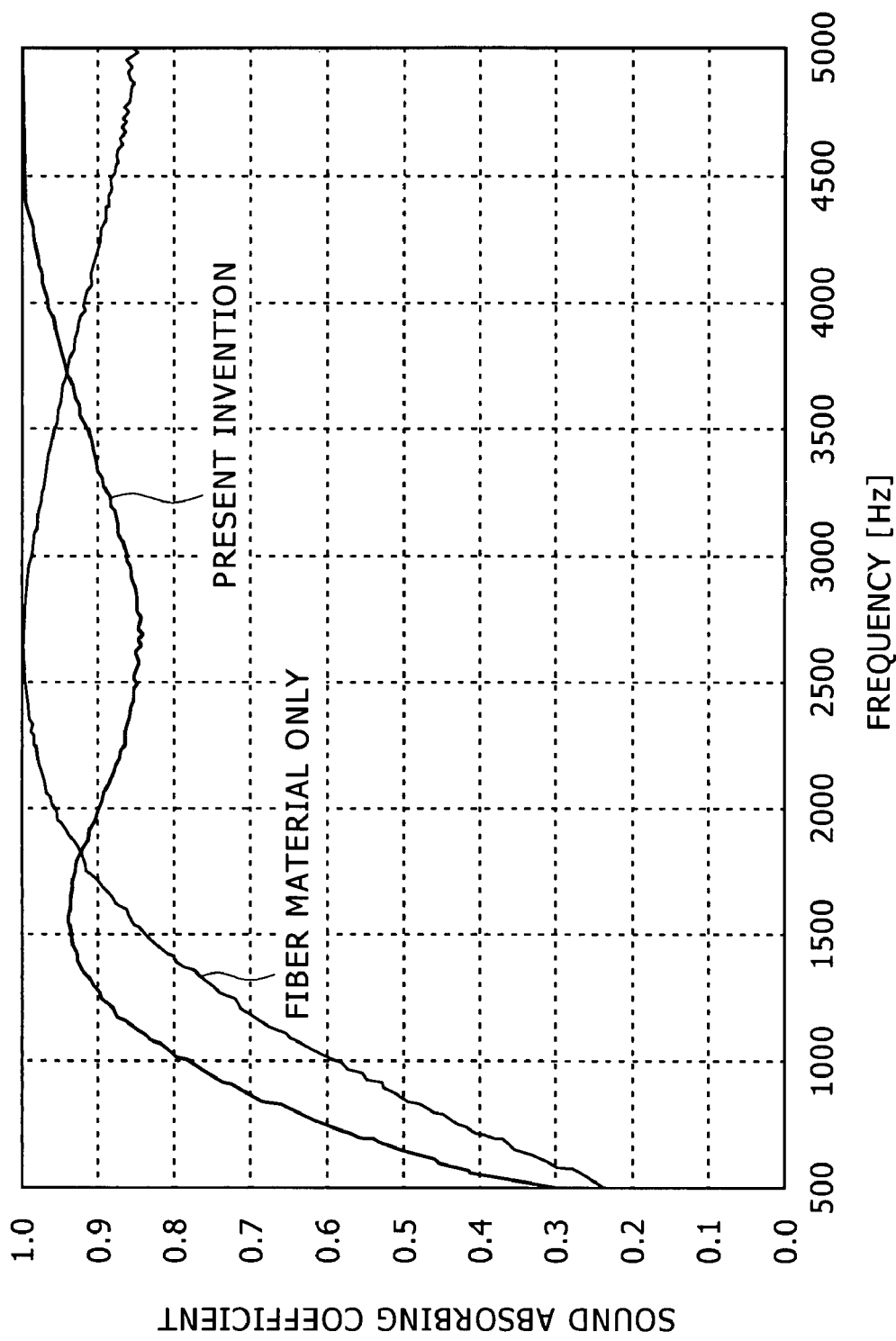
FIG. 25 is an explanatory view showing the sound absorbing effect of the sound absorbing structure according to the present invention.

As in FIG. 23, the transmission loss by each frequency and the sound absorbing coefficient by each frequency in the sound absorbing structure, where the perforated panel 2 is inserted between the layers of the fiber materials (4, 8), are respectively shown in FIG. 24 and FIG. 25 by thick lines. The sound absorbing structure of FIG. 23 is that the perforated panel having the thickness of 0.3 mm is inserted between the fiber material having the density of 60 kg/m$^3$ and the thickness of 20 mm and the fiber material having the density of 60 kg/m$^3$ and the thickness of 10 mm. As a comparison, the sound transmission loss and the sound absorbing coefficient in the case of only the fiber material having the density of 60 kg/m$^3$ (thickness 30 mm) are respectively shown in FIG. 24 and FIG. 25 by thin lines.

FIG. 24 and FIG. 25 show that the case where perforated panel 2 is inserted between the layers of the fiber materials (4, 8) has a larger transmission loss than the structure only by the fiber material and the sound insulating property is improved. Further, the drawing shows no remarkable difference when the case where the perforated panel 2 is inserted between the layers of the fiber materials (4, 8) and the structure only by the fiber material are compared at the sound absorbing coefficient.

(Preferable Mode of Aperture Ratio β of Through Holes in Perforated Panel)

Herein, description will be made for a preferable mode of the aperture ratio β of the through holes. As described above, although it is assumed that the aperture ratio β of the through holes (%), which is the ratio of the total area of all through holes to the surface area of the perforated panel 2 satisfy Equation (2), there is a preferable range for increasing the sound absorbing coefficient due to the relationship with the hole diameter d (mm) of the through holes.

Specifically, it is preferable that the aperture ratio β(%), after satisfying Equation (2), satisfy $β≧10^y$ where $y=-0.67×\log_{10}d-1.67$: Equation 2 or $β≦10^z$ where $z=-0.67×\log_{10}d+0.15$: Equation 3.

Equation 2 and Equation 3 are in the relationship of a lower limit and an upper limit respectively, and it is preferable to satisfy both of the Equation 2 and Equation 3 after satisfying Equation (2). In other words, it is preferable that the aperture ratio β, after satisfying Equation (2), be in a range sandwiched (surrounded) by Equation 2 (lower limit) and Equation 3 (upper limit).

In each drawing of FIGS. 18 to 21 (bonding type perforated panel example in FIG. 17) being an example of the above-described bonding type perforated panel, ranges severally satisfy Equation 1, Equation 2 and Equation 3 when Equation (2) is used as Equation 1, are shown in lines and arrows of circled numbers 1,2 and 3. In each drawing of FIG. 18 to FIG. 21, assuming that the density ρ of the fiber material and the thickness t of the fiber material satisfy Equation (1), in a range where the aperture ratio β satisfies Equation 1 and Equation 3, a range where the ratio satisfies Equation 1 and Equation 2, and a range where the ratio satisfies all of Equation 1 to Equation 3 (a range sandwiched by Equation 1 to Equation 3), the drawings show that ratio of an area having high sound absorbing coefficient becomes larger in this order. Specifically, the drawings show that by settings the aperture ratio β and the hole diameter d of the through holes to values within the range where all of Equation 1 to Equation 3 are satisfied, the sound absorbing coefficient in particular can be improved.

Herein, on the assumption that the density ρ of the fiber material and the thickness t of the fiber material satisfy $ρ×t≧0.01$ kg/m$^2$ of Equation (1), the sound absorbing performance (sound absorbing coefficient) when ρ×t is changed from 0.01 to 1.0 is shown in FIGS. 27 to 31. The sound absorbing structure, the measurement method of sound absorbing coefficient and the test condition were performed in the same manner as the above-described examples.

Figure 26:
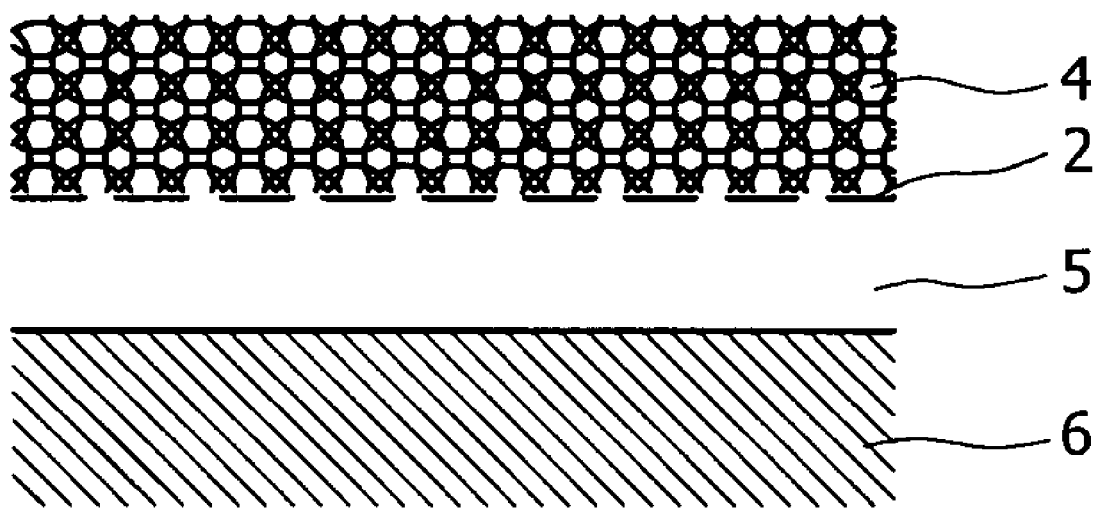
FIG. 26 is a sectional view showing another mode of the sound absorbing structure according to the present invention.
Figure 27:
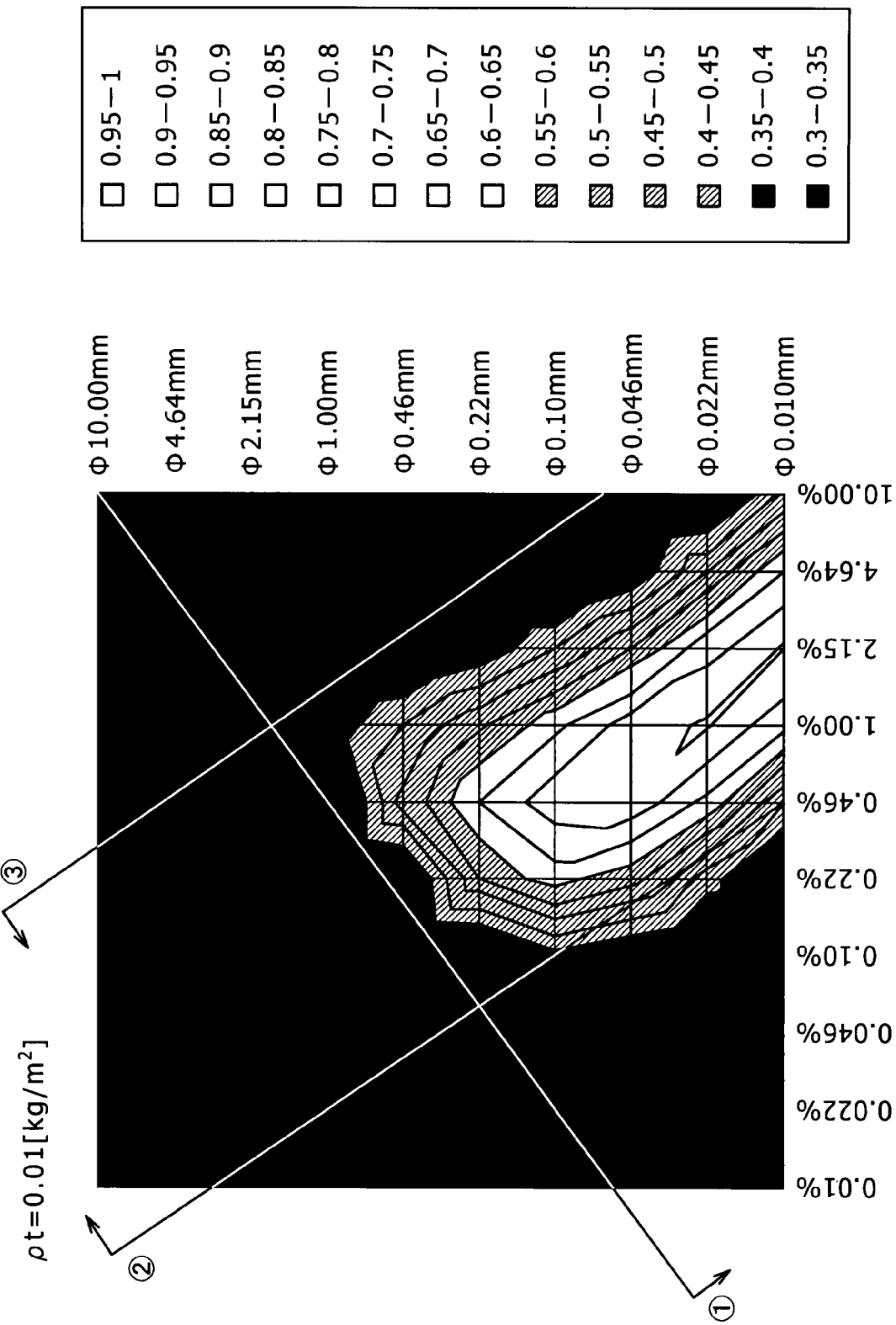
FIG. 27 is an explanatory view showing the sound absorbing effect of the sound absorbing structure according to the present invention.
Figure 28:
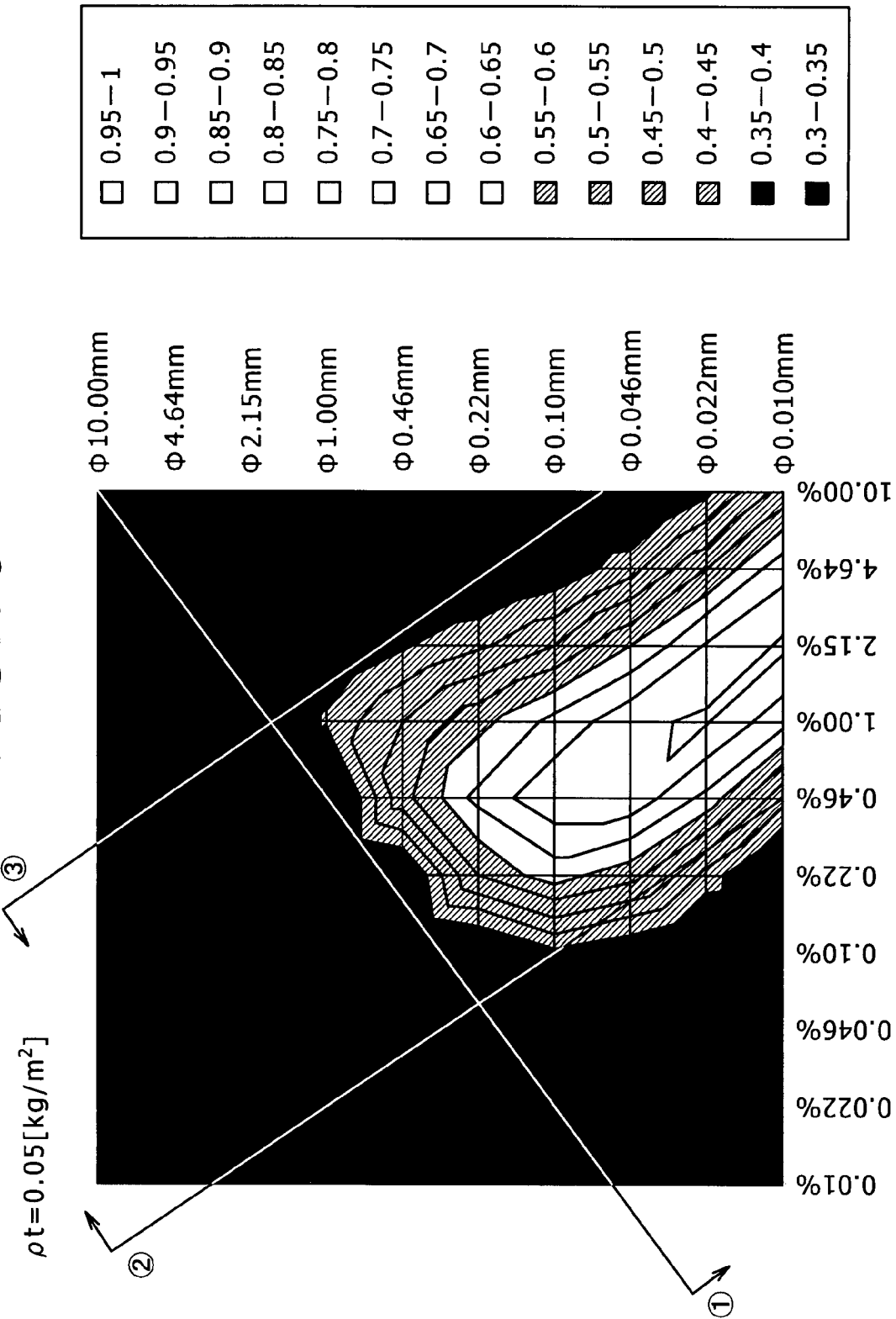
FIG. 28 is an explanatory view showing the sound absorbing effect of the sound absorbing structure according to the present invention.
Figure 29:
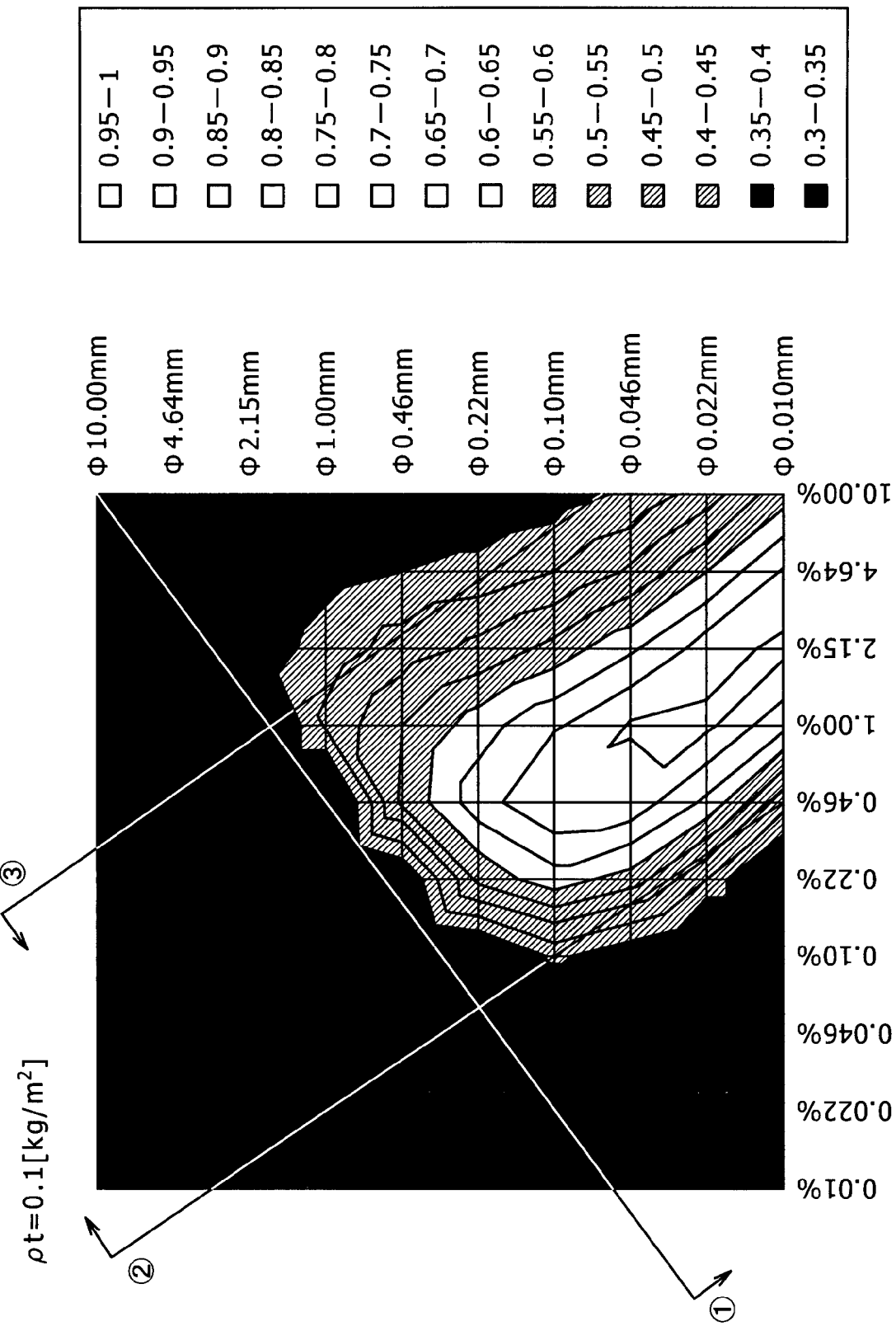
FIG. 29 is an explanatory view showing the sound absorbing effect of the sound absorbing structure according to the present invention.
Figure 30:
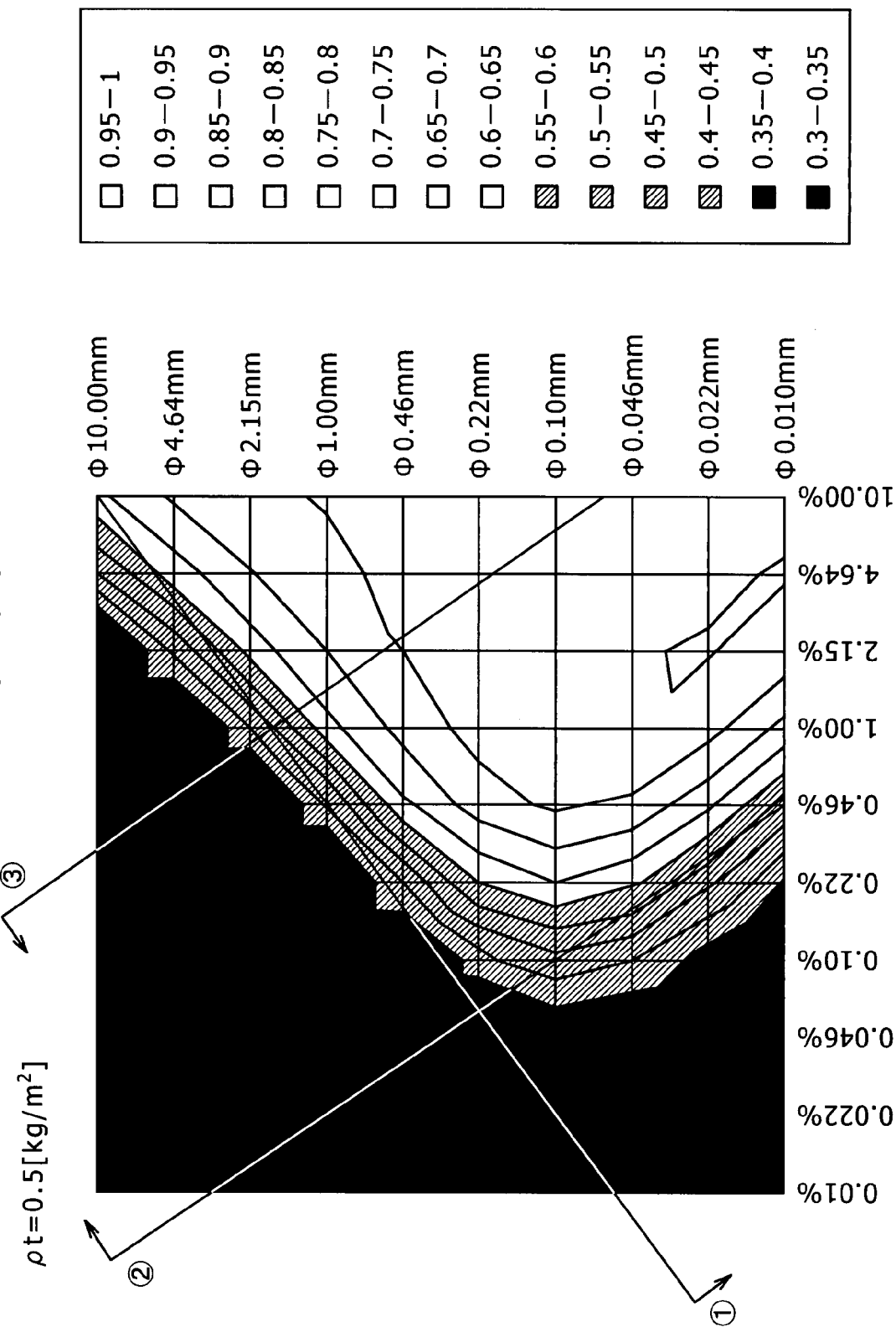
FIG. 30 is an explanatory view showing the sound absorbing effect of the sound absorbing structure according to the present invention.
Figure 31:
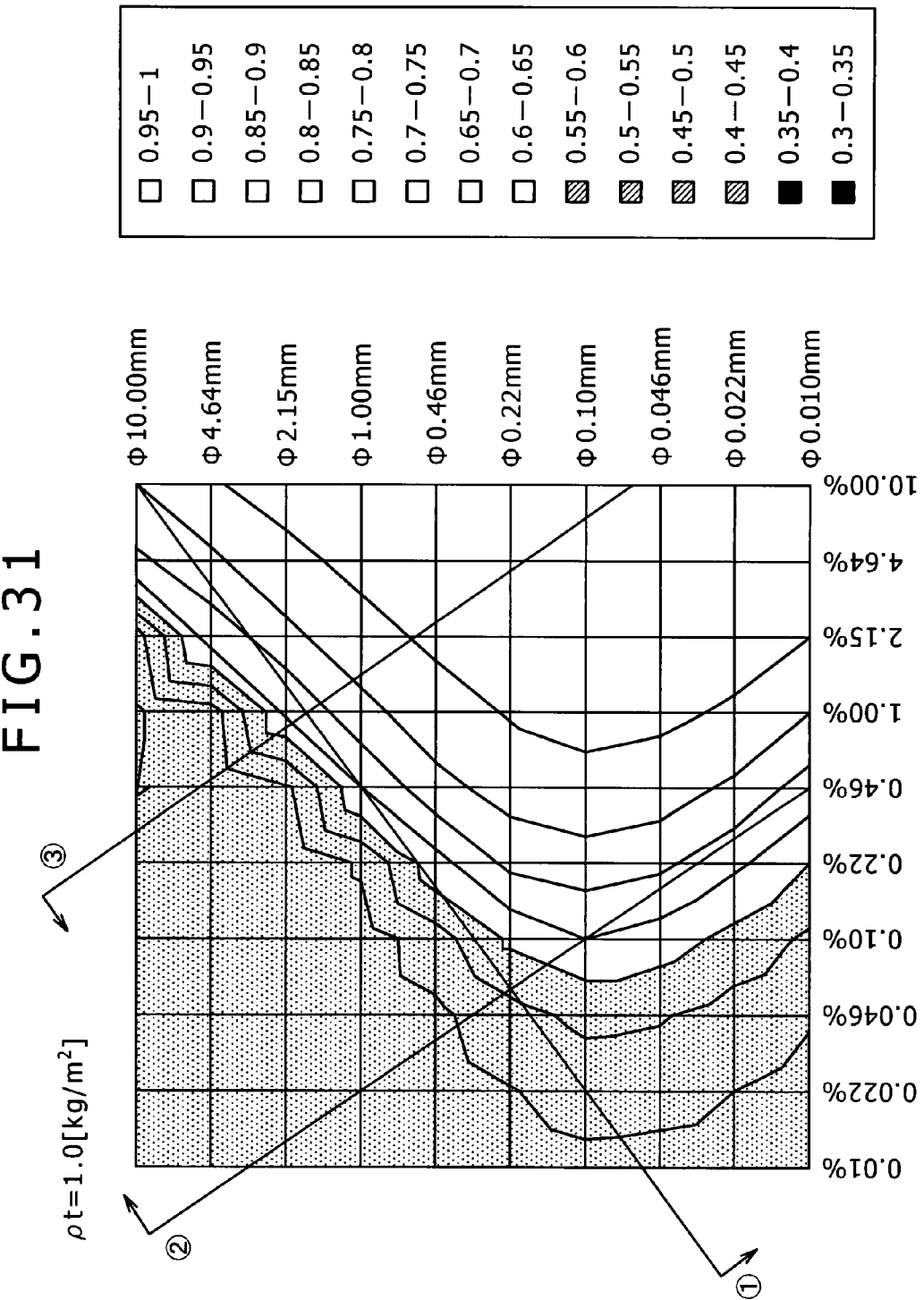
FIG. 31 is an explanatory view showing the sound absorbing effect of the sound absorbing structure according to the present invention.

The sound absorbing structure of FIG. 26 was used. Specifically, the one in which glass wool as the fiber material 4 was bonded to the aluminum porous foil 2 having the thickness of 80 μm (0.08 mm) is used. Then, by fixing the density ρ of the fiber material 4 and changing the thickness t of the fiber material 4, ρ×t was changed from 0.01 to 1.0. In FIGS. 27 to 31, the relationship between the hole diameter and the aperture ratio of the perforated panel, in which the sound absorbing coefficient of 0.4 or higher can be achieved is found from Equation (2) in the same manner as FIGS. 18 to 21. In each drawing, the white area is an area where the sound absorbing coefficient reaches 0.6 or higher, the gray area is an area where the sound absorbing coefficient reaches 0.4 to 0.6, and the black area is an area where the sound absorbing coefficient becomes less than 0.4. FIG. 30 and FIG. 31 show that the area (range) where the sound absorbing coefficient reaches 0.6 or higher has spread even if the hole diameter of the perforated panel is φ 0.5 mm or larger.

Further, in each drawing of FIGS. 27 to 31, ranges severally satisfy Equation 1, Equation 2 and Equation 3 when Equation (2) is used as Equation 1, are shown in lines and arrows of circled numbers 1,2 and 3. In each drawing of FIG. 27 to FIG. 31, assuming that the density ρ of the fiber material and the thickness t of the fiber material satisfy Equation (1), the drawings show that the range where the aperture ratio β satisfies all of Equation 1 to Equation 3 (range sandwiched by Equation 1 to Equation 3) has larger ratio of an area having high sound absorbing coefficient becomes than an area where the ratio satisfies Equation 1 and either Equation 2 or Equation 3. Specifically, the drawings show that by setting the aperture ratio β and the hole diameter d of the through holes to values within the range where all of Equation 1 to Equation 3 are satisfied, the sound absorbing coefficient in particular can be improved. Note that the same tendency of ρ×t as in FIGS. 27 to 31 applies to another mode of bonding type and sandwiching type.

(Improvement of the Rigidity of Perforated Panel)

The sound absorbing coefficient improving effect of the above-described bonding type perforated panel is achieved also by improving the rigidity of the perforated panel with bonding to make the structural attenuation of the perforated panel larger. The larger the vibration velocity of sound wave passing through the hole portion, the more the sound absorbing coefficient of the perforated panel improves. However, in the case where the perforated panel is resonated by sound wave, the holes themselves also moves together with sound wave passing through the hole portions. As the result, the vibration velocity of sound wave passing through the hole portions becomes relatively slow, and the sound absorbing coefficient is drastically reduced.

On the other hand, when the rigidity of the perforated panel is improved, the structural attenuation of the perforated panel becomes larger, and the resonance of perforated panel itself by sound wave is suppressed. As a result, the vibration velocity of sound wave passing through the hole portion (relative velocity of sound wave) becomes relatively fast, and the sound absorbing coefficient improves.

As a method of improving the rigidity of the perforated panel, the fiber material made of nonwoven fabric cloth and fiber in the above-described bonding type perforated panel, or a damping material, film or the like is bonded to the perforated panel (porous foil). Further, embossing finish is applied to the perforated panel (porous foil) itself to form concavo-convex. Improvement in rigidity of the perforated panel and the embossing finish to the perforated panel has not only the effect of improving rigidity but also the effect of improving the sound absorbing coefficient.

Figure 32:
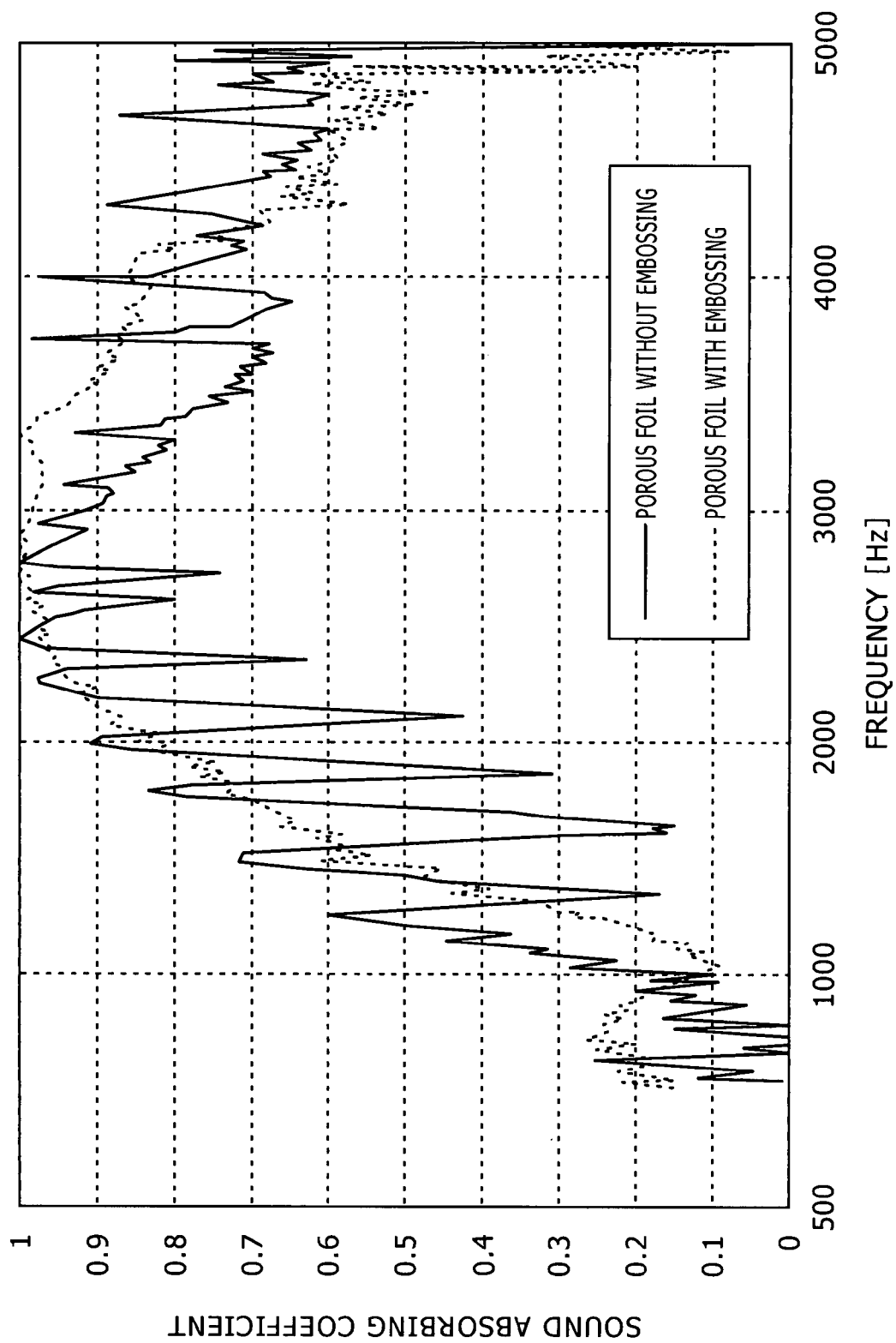
FIG. 32 is an explanatory view showing the sound absorbing effect of the sound absorbing structure according to the present invention.

FIG. 32 shows the sound absorbing coefficient by each frequency of the case where the embossing finish is applied to the aluminum porous foil 2 and the case where the embossing finish is not applied. In FIG. 32, a dark line shows the case where the embossing finish was applied, and a light line shows the case where the embossing finish was not applied. FIG. 32 shows that the sound absorbing coefficient improved in the case where the embossing finish was applied.

(Protection of Sound Absorbing Structure)

Figure 33:
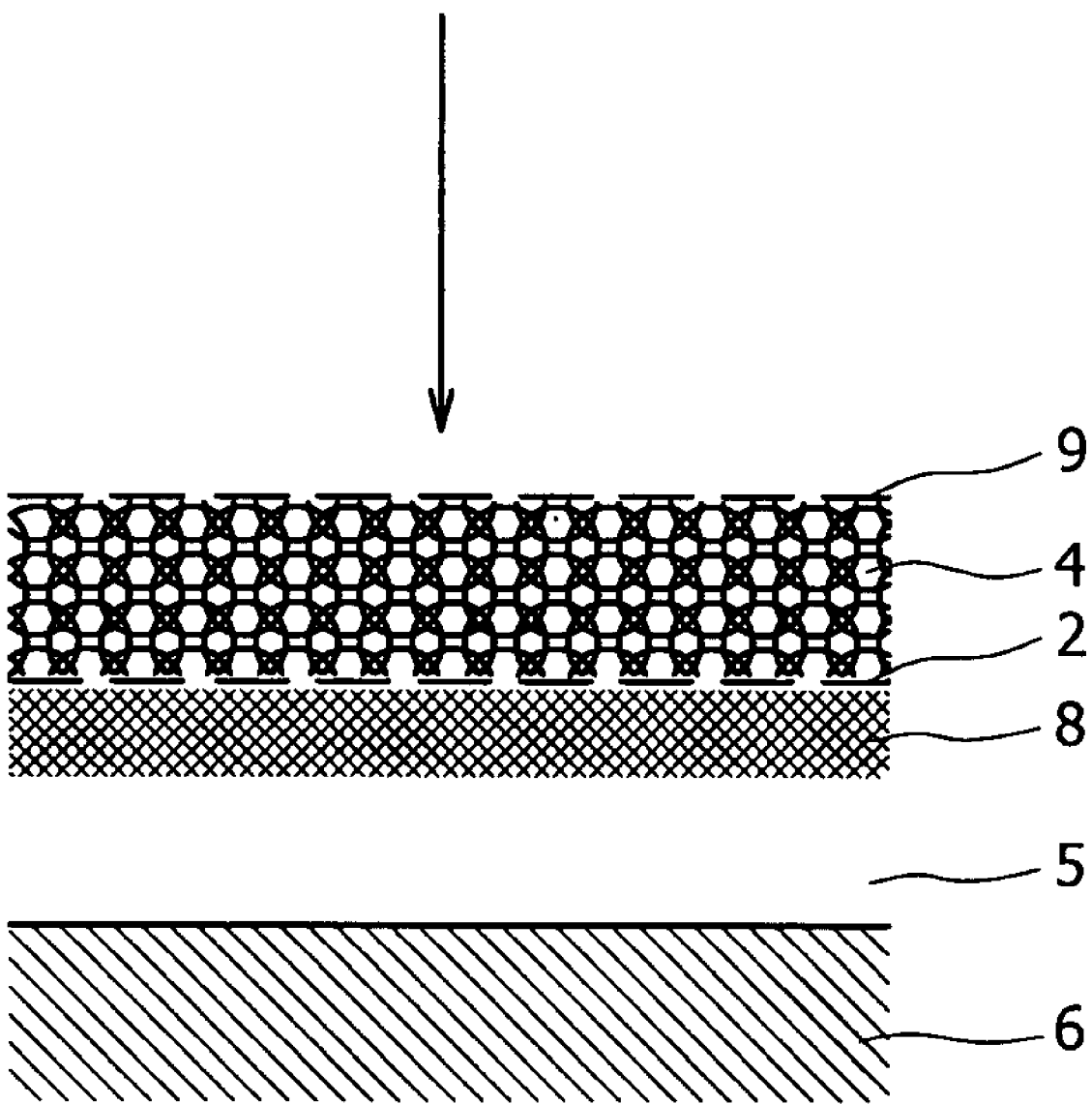
FIG. 33 is a sectional view showing another mode of the sound absorbing structure according to the present invention.

FIG. 33 shows a sound absorbing structure where a surface perforated panel 9 of perforated metal made of a steel thin plate is further arranged outside (sound wave side) of the sound absorbing structure (mode of FIG. 23) for protecting the sound absorbing structure. For sound absorbing structure protection, it may be covered not only by perforated metal but also by porous protective film.

Figure 34:
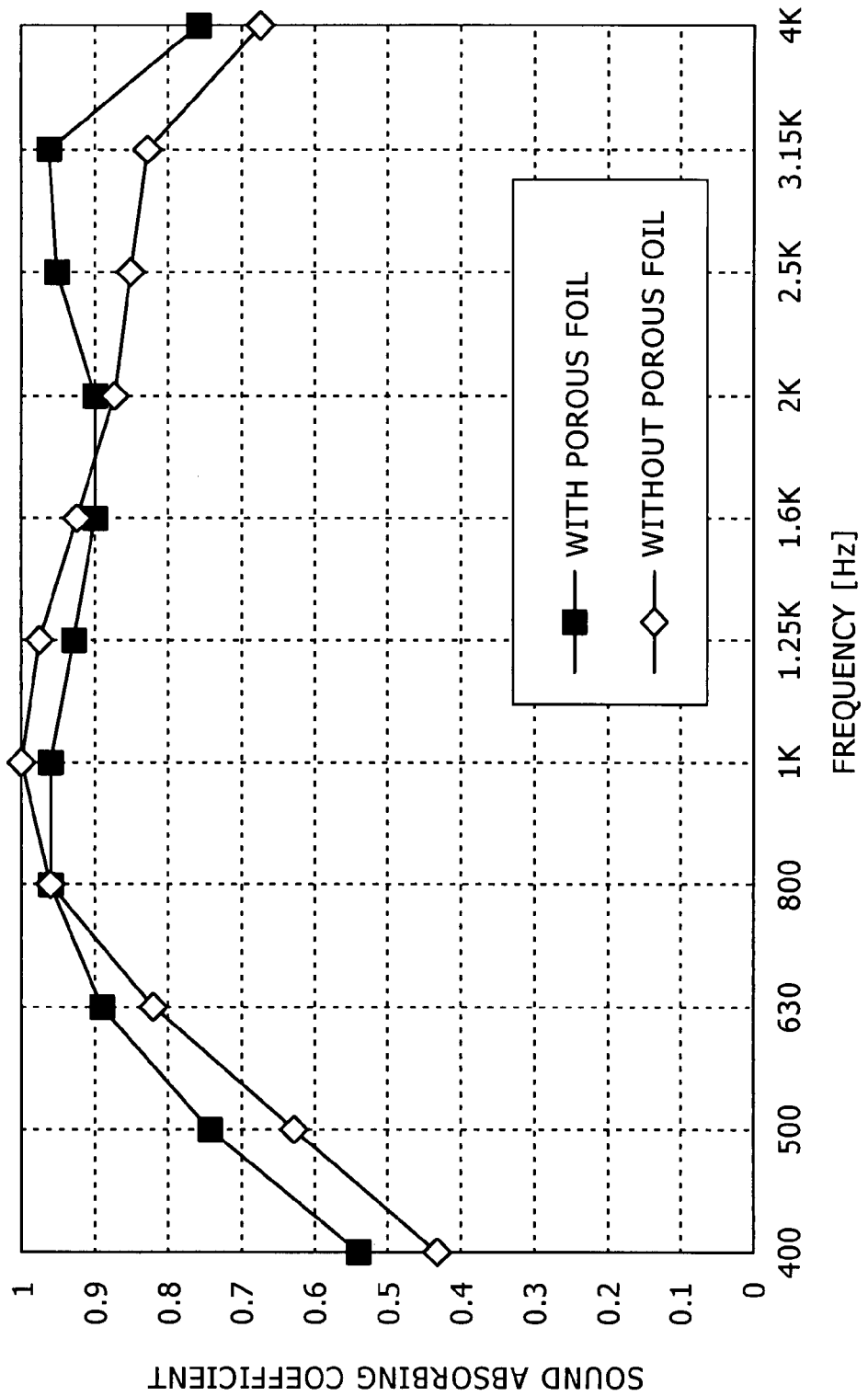
FIG. 34 is an explanatory view showing the sound absorbing effect of the sound absorbing structure according to the present invention.
Figure 35:
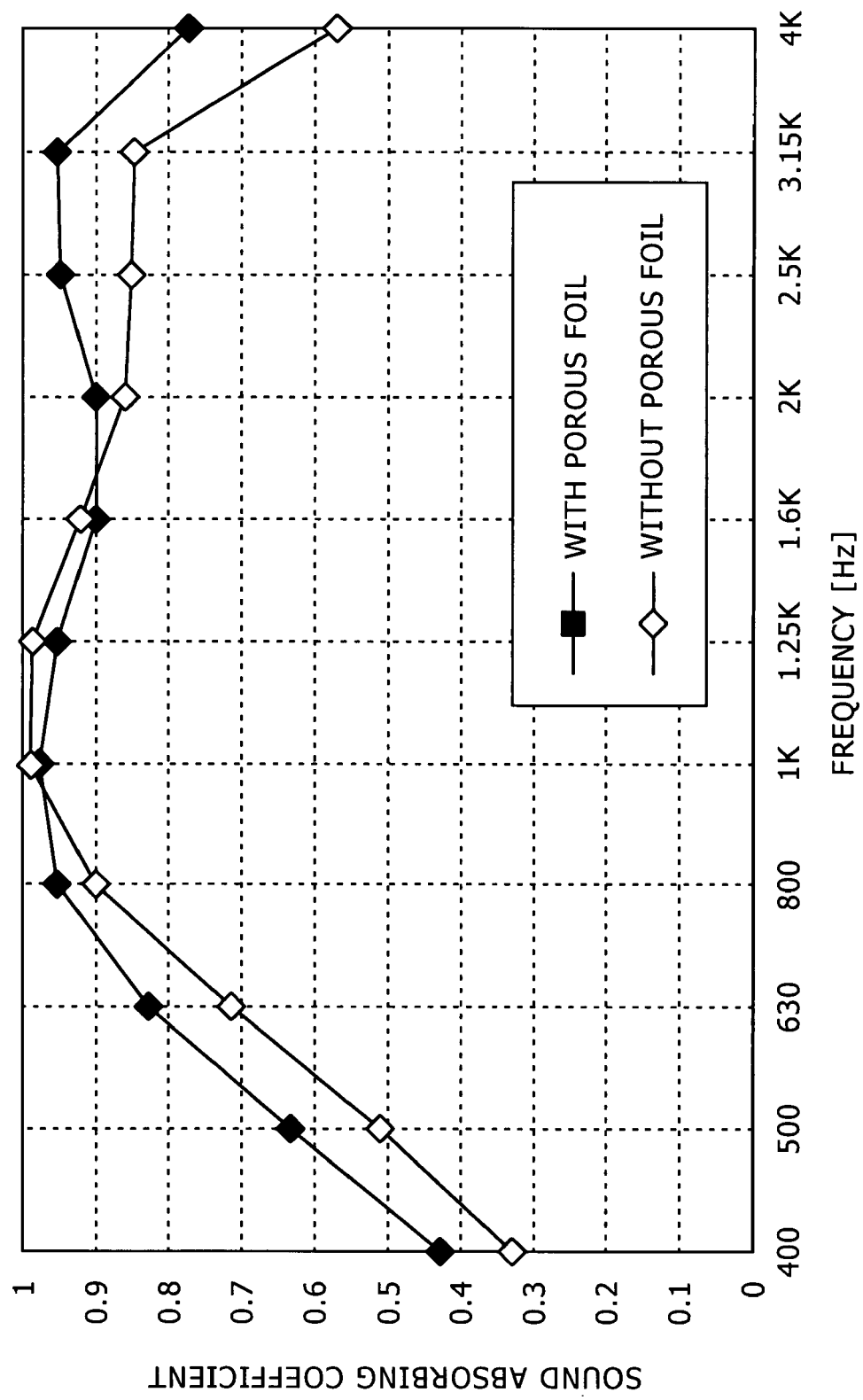
FIG. 35 is an explanatory view showing the sound absorbing effect of the sound absorbing structure according to the present invention.

FIGS. 34 to 36 show each sound absorbing coefficient by each frequency in the case where the condition of the fiber materials (4, 8) made of glass wool shown in FIG. 33 was changed. In FIG. 34, the diameter of glass wool of the fiber materials (4, 8) was set to 4 to 5 μm, the thickness of the fiber material 4 on the front side of the porous foil 2 was set to 10 mm, the thickness of the fiber material 8 on the rear side of the porous foil 2 was set to 30 mm, and the rear air layer 5 was formed as a thin layer of 1 mm or less. In FIG. 35, the diameter of the glass wool is the same as that of FIG. 34, but the thickness of the fiber material 4 on the front side of the porous foil 2 was set to 10 mm, the thickness of the fiber material 8 on the rear side of the porous foil 2 was set to 20 mm, and the rear air layer 5 was set to 10 mm. In FIG. 34 and FIG. 35, white square marks are the invention example, black square marks are a comparative example having the same condition as the invention example except that the porous foil 2 was not provided. FIG. 34 and FIG. 35 show that the invention example provided with the porous foil 2 has higher sound absorbing coefficient.

In FIG. 36, in the invention example where each thickness condition is the same as that of FIG. 34 and which is provided with the porous foil 2, influence caused by large/small diameters of the glass wool of the fiber materials (4, 8) is compared. In FIG. 36, white square marks are the case where the diameter of the glass wool of the fiber materials (4, 8) is relatively thick as 7 to 8 μm (described as a fiber sound absorbing material), and black square marks are the case where the diameter of the glass wool of the fiber materials (4, 8) is relatively thin as about 4 to 5 μm (described as a thin line fiber sound absorbing material). FIG. 36 shows that the case where the diameter of the glass wool of the fiber materials (4, 8) is narrow, that is, described as the thin line fiber sound absorbing material has higher sound absorbing coefficient.

INDUSTRIAL APPLICABILITY

According to the present invention, even in the case where the perforated panel is a thin plate such as aluminum foil and the through holes have a large hole diameter in order to facilitate the processing of providing a large number of through holes in the perforated panel, the sound absorbing structure excellent in sound absorbing performance, which is capable of achieving 0.4 or higher in the sound absorbing coefficient, can be provided. As a result, in the vehicle application of automotive vehicle or the like, by simple modification of a vehicle body itself, the present invention is not only applicable for the reduction of noise having engine sound as a principal element such as an engine hood and an engine under cover, but also can be freely used for other vehicle body panels such as fender, roof, door, dash board panel, that is, where noise needs to be reduced.

Further, other than this, it is possible to apply the present invention for structure application such as a sound barrier and a tunnel inner wall, or for various field applications where another sound absorption is necessary. In such a case, by reading the description of each constitution of the regarding the vehicle application while replacing vehicle terms with using areas and terms of another application or in accordance with the noise state of another application and the need of reducing noise, selection of an optimum embodiment for the application is made possible.

The invention claimed is:

1. A sound absorbing structure for suppressing noise generated on a sound source side, said sound absorbing structure comprising:

A perforated panel having a large number of through holes and a fiber material, which are oppositely provided on said sound source side and provided so as to be stacked on each other; and An air layer provided behind said perforated panel or said fiber material, wherein said fiber material satisfies Equation 1 below and said perforated panel satisfies Equation 2 below:

$$p \times t \geq 0.01 \text{ kg/m}^2; \quad \text{Equation 1:}$$

$$\beta \geq 10^x \quad \text{Equation 2:}$$

Where $x = (\frac{2}{3} \times \log_{10} d - \frac{1}{3})$ p: density of fiber material (kg/m³)
t: thickness of fiber material (mm)
d: hole diameter of through holes of perforated panel (mm)
β: aperture ratio of through holes of perforated panel (%).

2. The sound absorbing structure according to claim 1, wherein
the plate thickness of said perforated panel is less than 0.5 mm.

3. The sound absorbing structure according to claim 1, wherein
the density p of said fiber material is in the range from 10 to 400 kg/m³.

4. The sound absorbing structure according to claim 1, wherein
said fiber material consists of two or more layers of fiber material.

5. The sound absorbing structure according to claim 4, wherein
said perforated panel is inserted between the layers of said two or more layers of fiber material.

6. The sound absorbing structure according to claim 1, wherein
the aperture ratio $\beta$ of through holes of said perforated panel satisfies at least one of a first condition in which $\beta \geqq 10^y$ where $y=-0.67 \times \log_{10} d - 1.67$ and a second condition in which $\beta \leqq 10^z$ where $z=-0.67 \times \log_{10} d + 0.15$.

7. The sound absorbing structure according to claim 6, wherein
the aperture ratio $\beta$ of through holes of said perforated panel satisfies both of the first condition in which $\beta \geqq 10^y$ where $y=-0.67 \times \log_{10} d - 1.67$ and the second condition in which $\beta \leqq 10^z$ where $z=-0.67 \times \log_{10} d + 0.15$.

8. The sound absorbing structure according to claim 1, wherein
said sound absorbing structure is a sound absorbing structure for vehicle use, which is installed to a vehicle and used for suppressing noise generated on a sound source side of the vehicle.

* * * * *